(12) United States Patent
Utukuri

(10) Patent No.: US 11,615,568 B2
(45) Date of Patent: Mar. 28, 2023

(54) SYSTEM AND METHOD FOR EXPANDING A CANVAS

(71) Applicant: Vizetto Inc., Mississauga (CA)

(72) Inventor: Avanindra Utukuri, Mississauga (CA)

(73) Assignee: Vizetto Inc.

( * ) Notice: Subject to any disclaimer, the term of this patent is extended or adjusted under 35 U.S.C. 154(b) by 0 days.

(21) Appl. No.: 17/031,916

(22) Filed: Sep. 25, 2020

(65) Prior Publication Data

US 2021/0209823 A1 Jul. 8, 2021

Related U.S. Application Data

(63) Continuation of application No. PCT/CA2019/050392, filed on Apr. 1, 2019.

(60) Provisional application No. 62/651,086, filed on Mar. 31, 2018.

(51) Int. Cl.
| | | |
|---|---|---|
| G06F 3/048 | (2013.01) | |
| G06T 11/60 | (2006.01) | |
| G06F 3/0354 | (2013.01) | |
| G06F 3/042 | (2006.01) | |
| G06F 3/044 | (2006.01) | |
| G06F 3/04883 | (2022.01) | |
| G06T 3/20 | (2006.01) | |
| G06T 11/20 | (2006.01) | |

(52) U.S. Cl.
CPC .......... *G06T 11/60* (2013.01); *G06F 3/03542* (2013.01); *G06F 3/044* (2013.01); *G06F 3/0421* (2013.01); *G06F 3/04883* (2013.01); *G06T 3/20* (2013.01); *G06T 11/203* (2013.01); *G06F 2203/04106* (2013.01); *G06T 2200/24* (2013.01)

(58) Field of Classification Search
CPC ......... G06T 11/60; G06T 3/20; G06T 11/203; G06T 2200/24; G06F 3/03542; G06F 3/0421; G06F 3/044; G06F 3/04883; G06F 2203/04106; G06F 3/0481; G06F 3/0488; G01B 15/00
USPC .......................................... 702/151; 715/800
See application file for complete search history.

(56) References Cited

U.S. PATENT DOCUMENTS

| | | | |
|---|---|---|---|
| 2010/0223577 A1* | 9/2010 | Bennett ................. | G06F 3/0481 715/800 |
| 2014/0019085 A1* | 1/2014 | Utukuri ................. | G01B 15/00 702/151 |
| 2017/0123638 A1* | 5/2017 | Yamada ................ | G06F 3/0488 |

* cited by examiner

*Primary Examiner* — Abdul-Samad A Adediran

(57) ABSTRACT

Various systems and methods for selectively expanding a digital canvas are described. A slice line having a begin point and an end point may be defined within the digital canvas. The canvas may then be selectively expanded by moving drawing or other elements that project on slice line in a selected direction.

7 Claims, 14 Drawing Sheets

SYSTEM AND METHOD FOR EXPANDING A CANVAS

FIELD

The described embodiments relates in general to the field of computer graphics, and more particularly this invention relates to drawing applications having a virtual canvas.

BACKGROUND

Artists and other producers of visual content often use a drawing application on a computer that has a virtual canvas. These drawing applications typically rely on an interface that resembles the physical (non-virtual) act of drawing on a piece of canvas.

These drawing applications can provide a bitmapped canvas, wherein the canvas is represented by a two dimensional array of pixels each containing a color value associated with that pixel. Based on the resolution of pixels per inch (or per centimeter), the bitmapped image may distort or pixelate when zoomed.

Alternatively, a drawing application can provide a vector based drawing canvas. Vector based drawing canvas applications rely on a geometric formula to represent shapes that are displayed on the canvas.

In both bitmapped and vector cases, the traditional method for expanding the canvas is to add new canvas to the edges of existing canvas. This follows by analogy to the physical drawing process where new pieces of canvas may be appended at the edges.

SUMMARY

In a first aspect, some embodiments of the invention provide a method of expanding a digital canvas, comprising: providing a digital canvas; receiving a first user input comprising a slice gesture; determining a slice line on the digital canvas corresponding to the slice gesture; expanding the digital canvas based on the slice line; wherein the slice line comprises a start point and an end-point.

In some embodiments the method the expanding the digital canvas may comprise expanding the digital canvas along the slice line in a perpendicular direction to the slice line.

In some embodiments the slice line may comprise a slice line on the digital canvas corresponding to the slice gesture, the slice line may be projected in the digital canvas in either direction from both the start point and the end point.

In some embodiments the method may further comprise: receiving a second user input comprising a first shift gesture; determining a first shift line on the digital canvas corresponding to the first shift gesture; expanding the digital canvas along the slice line in the direction of the first shift line.

In some embodiments the method may further comprise: receiving a third user input comprising a second shift gesture generally opposite in direction to the first shift gesture; determining a second shift line on the digital canvas corresponding to the second shift gesture; expanding the digital canvas along the slice line in the direction of the first shift line; and expanding the digital canvas along the slice line in the direction of the second shift line.

In some embodiments the expanding the digital canvas may comprise adding a portion of canvas to the digital canvas bounded by determining a first bounding line comprising the line formed from the start point of the slice line and extending parallel to the first shift line a length of the first shift line; determining a second bounding line comprising the line formed from the end of the first bounding line and extending parallel to the slice line a length of the slice line; determining a third bounding line comprising the line formed from the end point of the second bounding line and the end point of the slice line; determining a fourth bounding line comprising the line formed from the end point of the slice line and extending parallel to the second shift line a length of the second shift line; determining a fifth bounding line comprising the line formed from the end of the fourth bounding line and extending parallel to the slice line a length of the slice line; and determining a sixth bounding line comprising the line formed from the end of the fifth bounding line and the start point of the slice line.

In some embodiments the method may further comprise providing a first shape located on the digital canvas inside a shift region bounded by a first projection line formed from the start point of the slice line and projected parallel to the first shift line in the direction of the first shift line; a second projection line formed from the end point of the slice line and projected parallel to the first shift line in the direction of the first shift line; and the slice line; wherein the expanding the digital canvas further comprises translating the object a length of the first shift line in the direction of the first shift line.

In some embodiments the method may further comprise: providing a second shape located on the digital canvas outside the shift region; the expanding the digital canvas further comprises maintaining the location of the second shape.\

In some embodiments the method may further comprise providing a third shape comprising at least two points; wherein at least one point of the at least two points is located on the digital canvas inside the shift region; the expanding the digital canvas further comprises translating the at least one point of the third shape in a length of the first shift line in the direction of the first shift line.

In some embodiments the method wherein providing a fourth shape may comprise at least two points; wherein at least one point of the at least two points may be located on the digital canvas inside the shift region; the expanding the digital canvas may further comprise creating a fifth shape comprising at least one point of the at least two points of the fourth shape outside the shift region; creating a sixth shape that may comprise at least one point of the at least two points of the fourth shape inside the shift region comprising: translating the sixth shape a length of the first shift line in the direction of the first shift line.

In another broad aspect, a system for an expandable digital canvas is provided comprising: a computer comprising: a processor; a memory; an input device; a display; wherein: the display shows the digital canvas; the processor operates to: provide a digital canvas; receive a first user input comprising a slice gesture; determine a slice line on the digital canvas corresponding to the slice gesture; expand the digital canvas based on the slice line; wherein the slice line comprises a start point and an end point.

In some embodiments the processor may be further operable to: receive a second user input comprising a first shift gesture; determine a first shift line on the digital canvas corresponding to the first shift gesture; expand the digital canvas along the slice line in the direction of the first shift line.

In some embodiments the processor may be further operable to: receive a third user input comprising a second shift gesture generally opposite in direction to the first shift gesture; determine a second shift line on the digital canvas corresponding to the second shift gesture; expand the digital canvas along the slice line in the direction of the first shift line; and expand the digital canvas along the slice line in the direction of the second shift line.

In some embodiments the processor may be further operable to provide a first shape located on the digital canvas inside a shift region bounded by a first projection line formed from the start point of the slice line and projected parallel to the first shift line in the direction of the first shift line; a second projection line formed from the end point of the slice line and projected parallel to the first shift line in the direction of the first shift line; and the slice line; wherein the expanding the digital canvas further comprises translating the object a length of the first shift line in the direction of the first shift line.

In some embodiments the input device may comprise a touch screen.

In some embodiments the touch screen may comprise a capacitive touch screen.

In some embodiments the touch screen may comprise: a display, a frame, at least three radiation sensors mounted to the frame including a first radiation sensor, a second radiation sensor and a third radiation sensor, wherein the first, second and third radiation sensors are spaced from one another; a plurality of radiation sources mounted to the frame, wherein at least some of the radiation sources are visible to each of the radiation sensors; and the processor coupled to radiation sources and the radiation sensors; wherein the processor senses the position of a radiation blocking object and sends user input comprising at least one gesture.

In some embodiments the system may further comprise: a stylus comprising: a handle; a radiation blocking member extending radially from the handle; a tip extends opposite from the handle having a contact portion; and wherein the contact portion is in slidable contact with the display and the height of the tip corresponds to the height of an optical plane above the display; wherein the stylus cooperates with the touch screen to generate user input.

BRIEF DESCRIPTION OF THE DRAWINGS

A preferred embodiment of the present invention will now be described in detail with reference to the drawings, in which.

DESCRIPTION OF EXEMPLARY EMBODIMENTS

Figure 1:
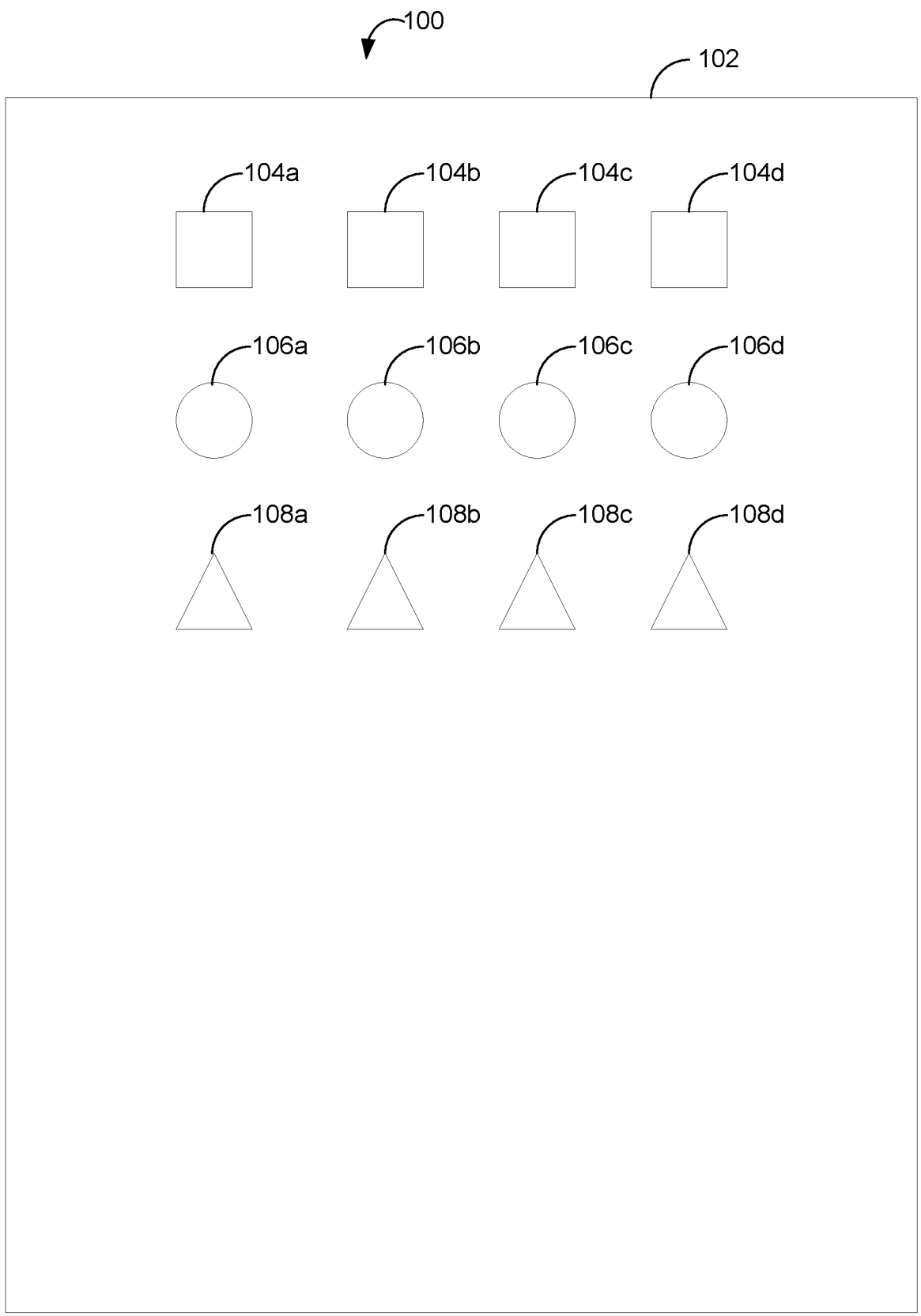
FIG. 1 is a user interface diagram of a canvas and a plurality of shapes in accordance with an example embodiment.

The various embodiments described herein generally relate to methods (and associated systems configured to implement the methods) for canvas expansion.

Drawing applications may generally use a digital canvas to represent the user's work. The canvas expansion systems and methods disclosed herein may be used to enable users to draw, for educational purposes such as in an art class, for collaborative work between a plurality of users each having a display device with the drawing application. Drawing applications may refer to bitmapped drawing or vector drawing applications.

A drawing application as described herein may execute on a variety of different display devices having a plurality of different types of input. For instance, the display device may be a mobile device such as an Apple iPhone or iPad, an Android device, a desktop computer, a laptop computer, or a gaming console connected to a television. A variety of different input devices may be used in conjunction with the drawing app including a capacitive LCD touch screen or the like, a mouse, a keyboard, a trackpad, or any other input device. The screen and the input device may be provided in combination, for instance with a capacitive touch display. Additional description of surface touch sensing systems and methods that may be used herein can be found in U.S. Pat. No. 9,582,116, "Systems and methods for sensing and tracking radiation blocking objects on a surface", filed Mar. 3, 2013, U.S. Pat. No. 9,453,726, "Systems and methods for sensing and tracking radiation blocking objects on a surface", filed Aug. 27, 2013, U.S. Pat. No. 9,395,185, "Modular position sensing systems and methods", filed Dec. 2, 2012, U.S. Pat. No. 8,969,822, "Two-dimensional and three-dimensional position sensing systems and sensors therefor", filed Dec. 16, 2011, U.S. Pat. No. 9,395,185, "Modular position sensing systems and methods", filed Dec. 2, 2012, U.S. Pat. No. 8,969,769, "Two-dimensional position sensing systems and sensors therefor", filed Dec. 16, 2011, U.S. Pat. No. 8,928,873, "Sensors, systems and methods for position sensing", filed Mar. 25, 2013, and U.S. Pat. No. 8,405,824, "Sensors, systems and methods for position sensing", filed Mar. 18, 2011.

Reference is first made to FIG. 1, which illustrates a user interface 100 showing a plurality of shapes and a digital canvas 102. A plurality of squares 104a, 104b, 104c and 104d are shown on the canvas. A plurality of circles 106a, 106b, 106c and 106d are shown on the canvas. A plurality of triangles 108a, 108b, 108c and 108d are shown on the canvas. A user may interact with the digital canvas using a touch interface such as touch screen or a track pad, or may use a pointing device such as a mouse, trackball, or trackpad. The interaction using a touch interface may be done with the user's finger or fingers, with a stylus, or another assistive device.

Figure 2:
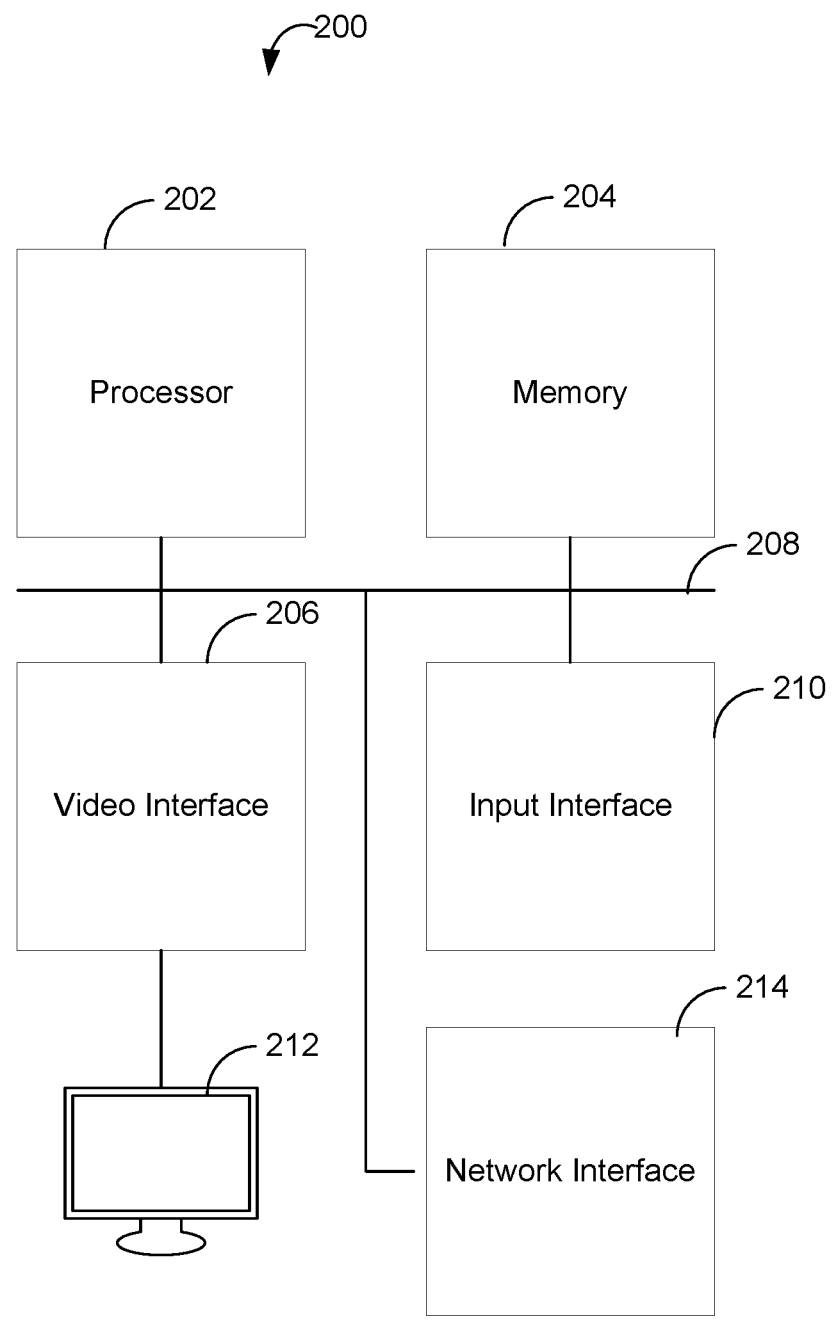
FIG. 2 is an system diagram of a display device in accordance with an example embodiment.

Reference is made to FIG. 2, showing a display device system 200 in accordance with one embodiment. The display device system includes a processor 202, memory 204, a video interface 206, an input interface 210, a network interface 214 and a display 212. Display 212 may be an LCD, CRT, LED, OLED, or plasma screen. The video interface 206 may connect display 212 to the display device, and may be operable to render the canvas. The screen 202 and the input device 208 may be combined, for example, by using a capacitive touch display system using a participants finger or fingers and optionally using a stylus. Processor 202 may be any known processor, for example one using an Intel™ x86 or x86_64 architecture, an ARM™ microprocessor, a Qualcomm™ Snapdragon™, or a processor provided by a virtualization environment. The input interface 210 may connect a mouse, keyboard, controller, touch screen, eye focus tracking device, trackpad, motion sensing accelerometer, trackball, a microphone, or the like to the displace device. The display device 200 may be a mobile device such as a mobile phone, a tablet device, a desktop computer, a laptop computer, a wearable computer such a Google™ Glass, a virtual reality device such as Sony™ Playstation VR™ or Oculus™ Rift™, or any other suitable device. Memory 204 may be volatile or non-volatile storage or a combination of both. Network 104 may be a TCP/IP switched network, a LAN network, a WAN network, or the Internet. The display device may be connected to a network, and the connection may be provided by network interface 214 using a connection technology such as Ethernet, Firewire, Bluetooth, Wireless (802.11 or the like), modem, or digital subscriber line connection.

Figure 3A:
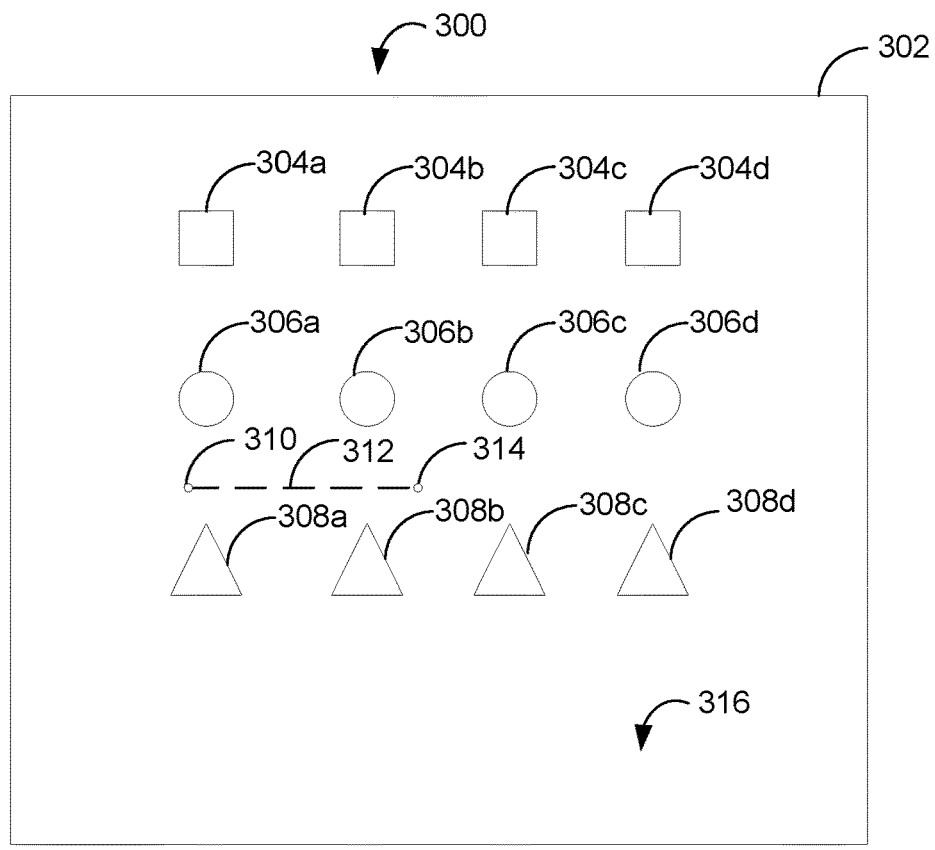
FIGS. 3A-3B are user interface diagrams of a canvas in accordance with an example embodiment.

Reference is made to FIG. 3A which illustrates a user interface 300. The user interface 300 has viewport 302 with canvas surface 316 with a plurality of objects displayed on it including a plurality of squares 304a, 304b, 304c and 304d, a plurality of circles 306a, 306b, 306c and 306d, and a plurality of triangles 308a, 208b, 308c and 308d. A user interacts with the user interface 300 by entering user input corresponding to a slice line. The user input may comprise a series of points. On canvas 316, a user inputs a slice line 312 representing a series of points including a start point 310 and an end point 314. The canvas 316 may be larger than the viewport 302 and the user may be able to scroll.

Figure 3B:
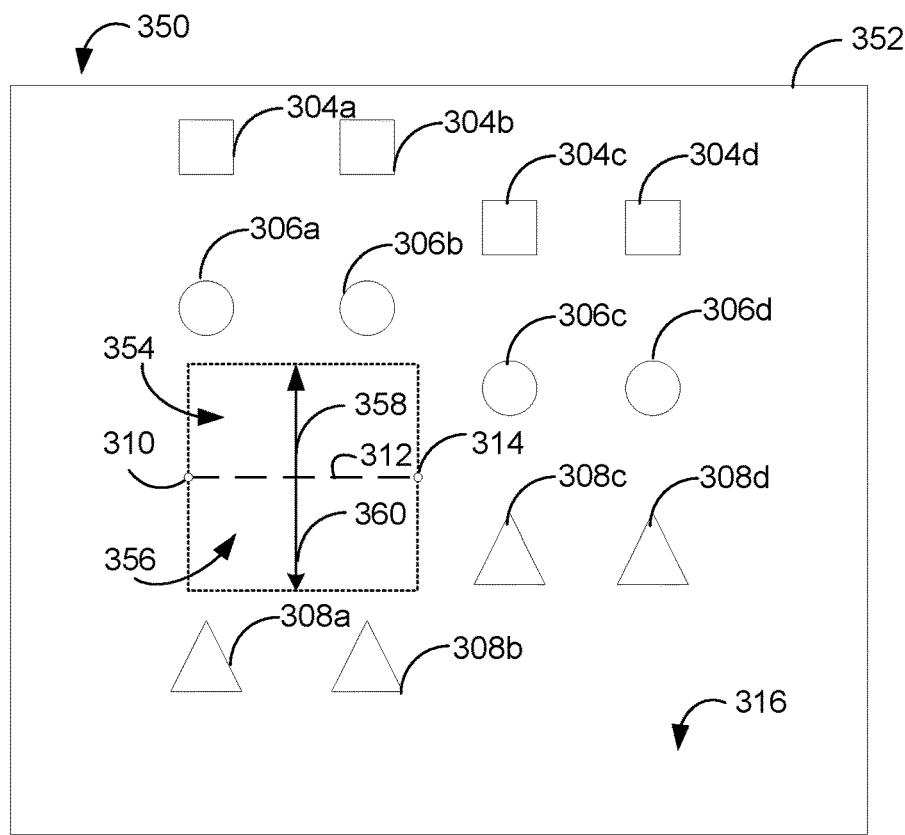

Reference is made to FIG. 3B, which illustrates the canvas expansions 354 and 356. The canvas expansion 354 is generally defined as a rectangle including the start point 310, the end point 314, the rectangle width being the length of the shift line 358. Similarly, a second canvas expansion 356 is generally defined as a rectangle including the start point 310, the end point 314, the rectangle width being the length of the shift line 360. In this embodiment, the shift lines 358 and 360 are a constant length, and the user may expand the canvas 316 simply by the slice line 312 user input.

When the shift is applied, and the canvas is expanded at 354 and 356, it is noted that the squares 304a and 304b and the circles 306a and 306b also translate according to the canvas expansion 354. The triangles 308a and 308b translate according to the canvas expansion 356 in a direction opposite to objects 304a, 304b, 306a, and 306b. As stated before, the canvas 316 may be larger than the viewport 352, and the expansion of the canvas may extend a region from inside the viewport 352 to outside the viewport. The slice line 312 is shown as generally horizontal, however it may be of any size or direction. Objects including squares 304c, 304d, circles 306c, 306d and triangles 308c and 308d do not translate based on the canvas expansions 358 and 360 and remain.

Figure 4:
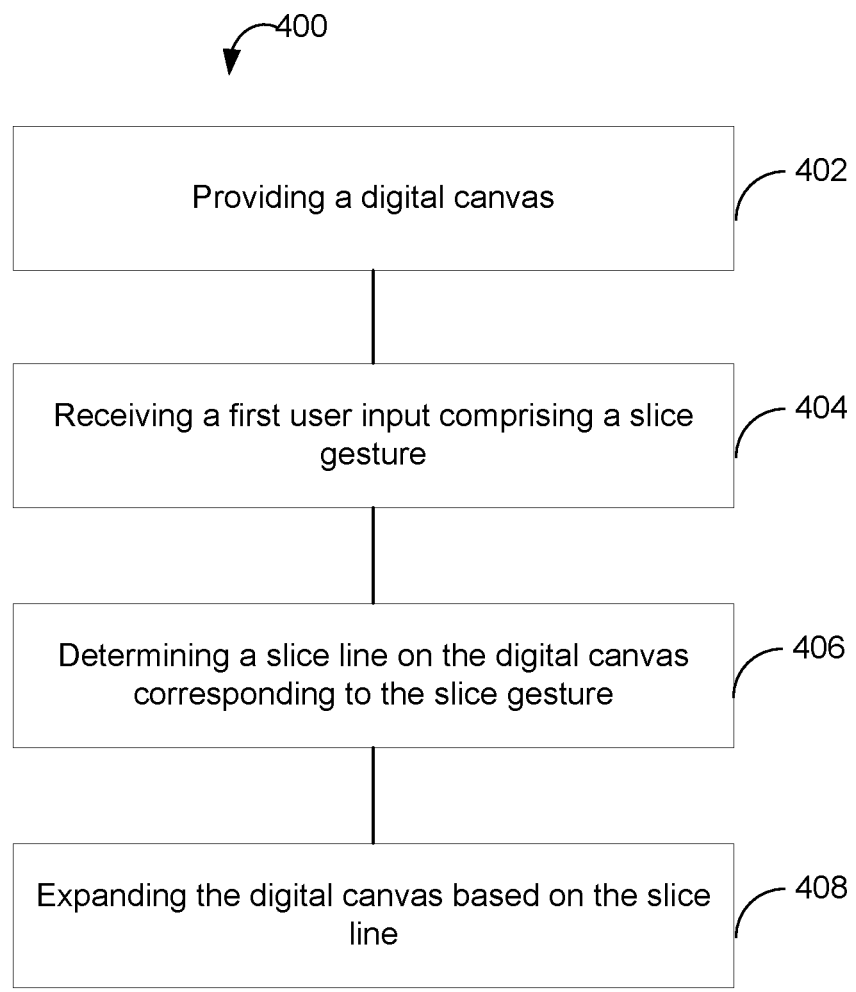
FIG. 4 is a flow diagram showing a method of expanding a digital canvas in accordance with an example embodiment.

Referring to FIG. 4, which illustrates a flow diagram for the method of canvas expansion shown in FIGS. 3A-3B. At 402, a digital canvas is provided that the user may interact with using a variety of different input methods. The digital canvas may combine an input device with a display device. The canvas may be viewed through a viewport on the display device, but the canvas may be larger than the viewport itself. The expansion of the canvas may also change the shape of the canvas, and may translate a portion of the canvas inside the viewport to outside the viewport.

At 404, a user interacts with the display device using the user input device. The interaction may be a slice gesture that is recognized by the drawing application. The first user input may be a slice gesture, and may be a motion on a touch surface such as a swipe, or may be a gesture from a pointing device like a mouse. In the case that the slice gesture is made using a pointing device, the start point may be determined by a mouse button down event and the end point may be determined from a mouse button up event. The first user input may be a series of points associated with the first user input.

At 406, the slice line is determined on the canvas from the slice gesture. The first user input may be a series of points within the viewport including a start point and an end point, and these points may operate to describe the slice line. The slice line may be generally straight or it may be curved.

At 408, the canvas is expanded at the point of the slice line by a fixed distance in an orthogonal direction to the slice line. The orthogonal line to the slice line may be called the shift line. In the case that the slice line is curved, the shift line may be based on an averaged line or a linear regression of the series of points. The fixed distance may be configurable in the drawing application.

Figure 5A:
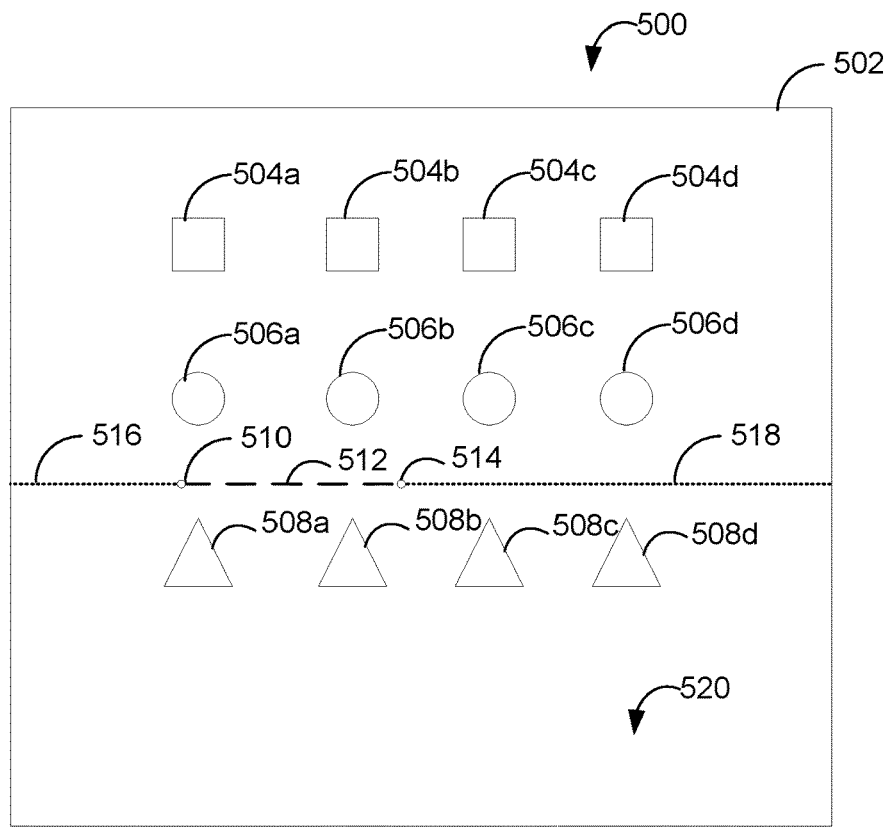
FIGS. 5A-5B are user interface diagrams of a canvas in accordance with an example embodiment.
Figure 5B:
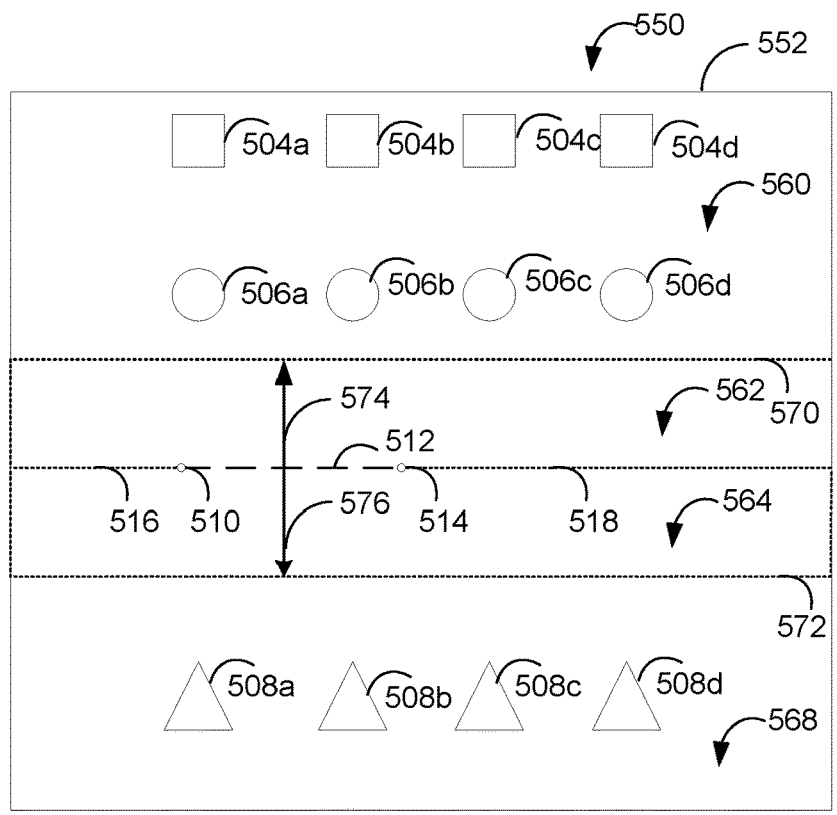

Referring to FIGS. 5A and 5B, which illustrate a user interface involving a second method of expanding a digital canvas 520. The user inputs a slice gesture that corresponds to slice line 512 including a start point 510 and an end point 514. In this second method of expanding a digital canvas, line projection 516 extends from the start point 510 based on a projection of the regression line of slice line 512. Line projection 518 extends from the end point 514 based on a projection of the regression line of slice line 512.

FIG. 5B shows the canvas expansions 562 and 564 based on slice line 512. In this embodiment of the method, the line projections 516 and 518 define the canvas expansions 562 and 564 to the edge of the viewport 552. Line projection 516, slice line 512, line projection 518 and shift line 574 define a first rectangular region of canvas expansion 562. Line projection 516, slice line 512, line projection 518 and shift line 574 define a second rectangular region of canvas expansion 564. The first rectangular canvas expansion is bounded by the line projection 516, slice line 512, line projection 518, the viewport edges, and line 570. Line 570 is orthogonal to shift line 574. The shift lines 574 and 576 in this example are fixed length, but as described below, they may be defined by a shift gesture provided by a user. In another embodiment, the line projections 516 and 518 may instead extend to the edge of the canvas 520 itself, and the canvas projection may similarly extend across the entire canvas.

Objects including squares 504a, 504b, 504c, 504d, circles 506a, 506b, 506c, 506d have translated upwards relative to the viewport as the canvas has expanded based on canvas expansion 562. Similarly, objects including triangles 508a, 508b, 508c, 508d have translated downwards relative to the viewport as the canvas has expanded based on canvas expansion 564.

Figure 6:
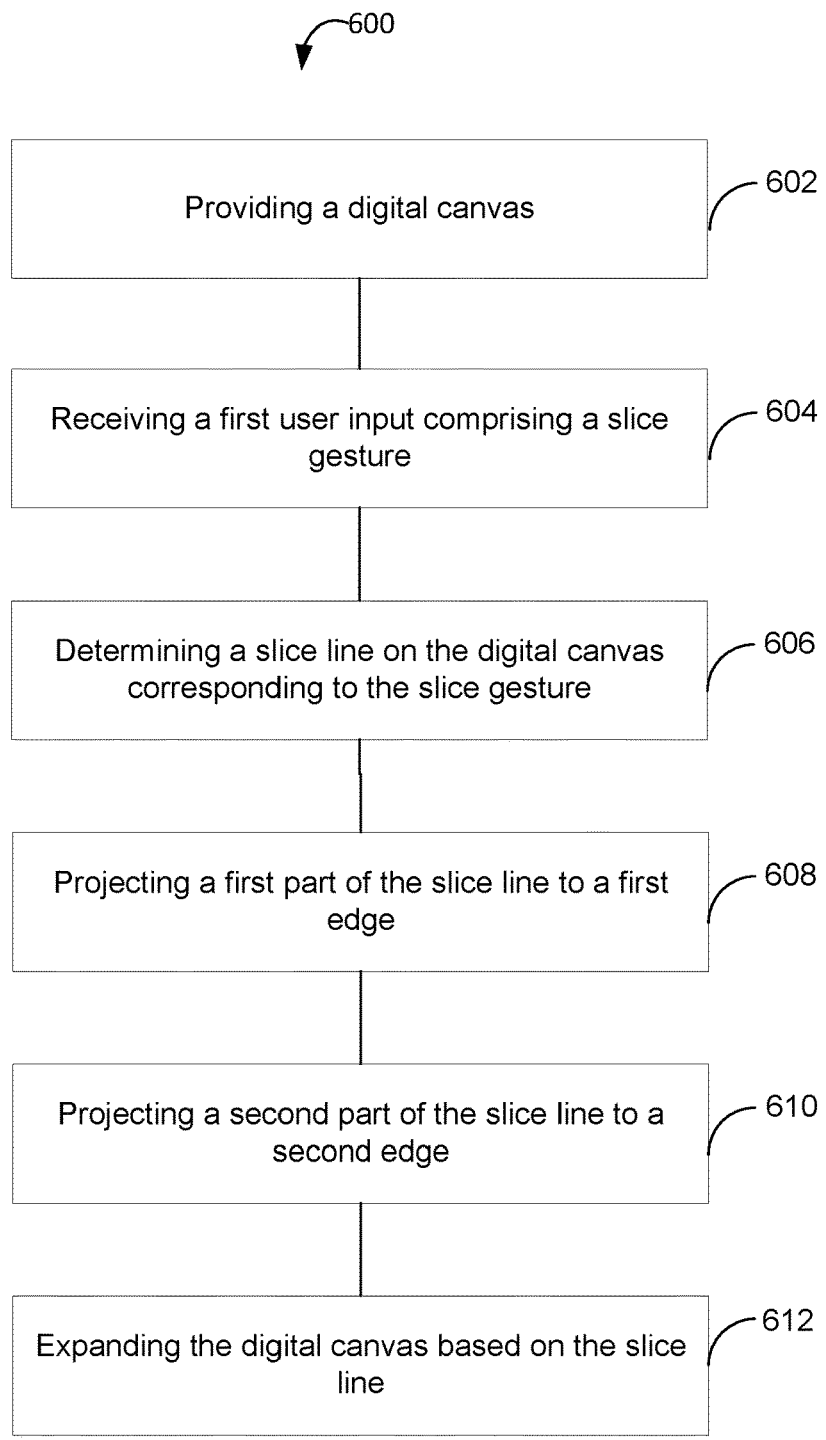
FIG. 6 is a flow diagram showing a method of expanding a digital canvas in accordance with an example embodiment.

Referring to FIG. 6, which illustrates a flow diagram 600 for the method of canvas expansion shown in FIGS. 5A-5B.

At 602, a digital canvas is provided that the user may interact with using a variety of different input methods. The digital canvas may combine an input device with a display device. The canvas may be viewed through a viewport on the display device, but the canvas may be larger than the viewport itself. The expansion of the canvas may also change the shape of the canvas, and may translate a portion of the canvas inside the viewport to outside the viewport.

At 604, a user interacts with the display device using the user input device. The first user input may be a slice gesture that is recognized by the drawing application. The slice gesture may be a motion on a touch surface such as a swipe, or may be a gesture from a pointing device like a mouse. In the case that the slice gesture is made using a pointing device, the start point may be determined by a mouse button down event and the end point may be determined from a mouse button up event. The first user input may be a series of points associated with the gesture.

At 606, the slice line is determined on the canvas from the first user input. The first user input may be a series of points within the viewport including a start point and an end point, and these points may operate to describe the slice line. The slice line may be generally straight or it may be curved.

At 608, a first part of the slice line may be projected towards an edge of the viewport. The first part begins at the start point of the slice line, and projects towards the edge of the viewport along a line based on a linear regression of the points in the slice line. Optionally, the first part of the slice line may be projected towards an edge of the canvas instead of the edge of the viewport.

At 610, a second part of the slice line may be projected towards an edge of the viewport. The second part begins at the end point of the slice line, and projects towards the edge of the viewport along a line based on a linear regression of the points in the slice line. Optionally, the second part of the slice line may be projected towards an edge of the canvas instead of the edge of the viewport.

At 612, the canvas is expanded at the point of the slice line by a fixed distance in an orthogonal direction to the slice line. An orthogonal line to the slice line may be called the shift line. In the case that the slice line is curved, the shift line may be based on an averaged line or a linear regression of the series of points. The fixed distance may be configurable in the drawing application.

Optionally, as described below, the user may input the shift line based on a shift gesture.

Figure 7A:
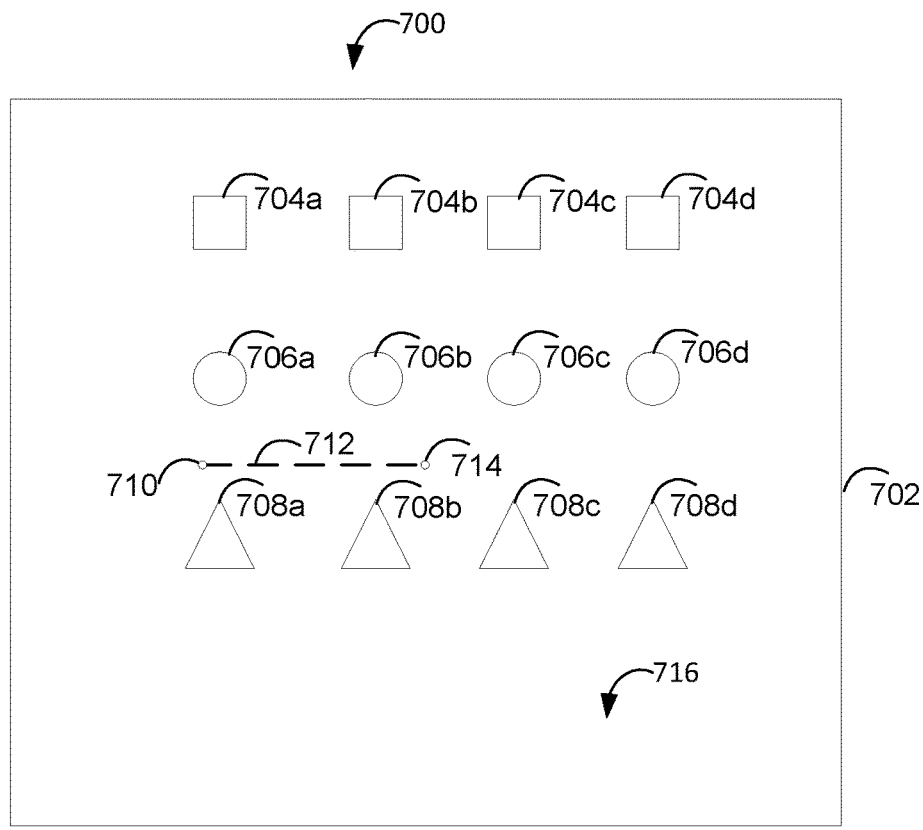
FIGS. 7A-7B are user interface diagrams of a canvas in accordance with an example embodiment.
Figure 7B:
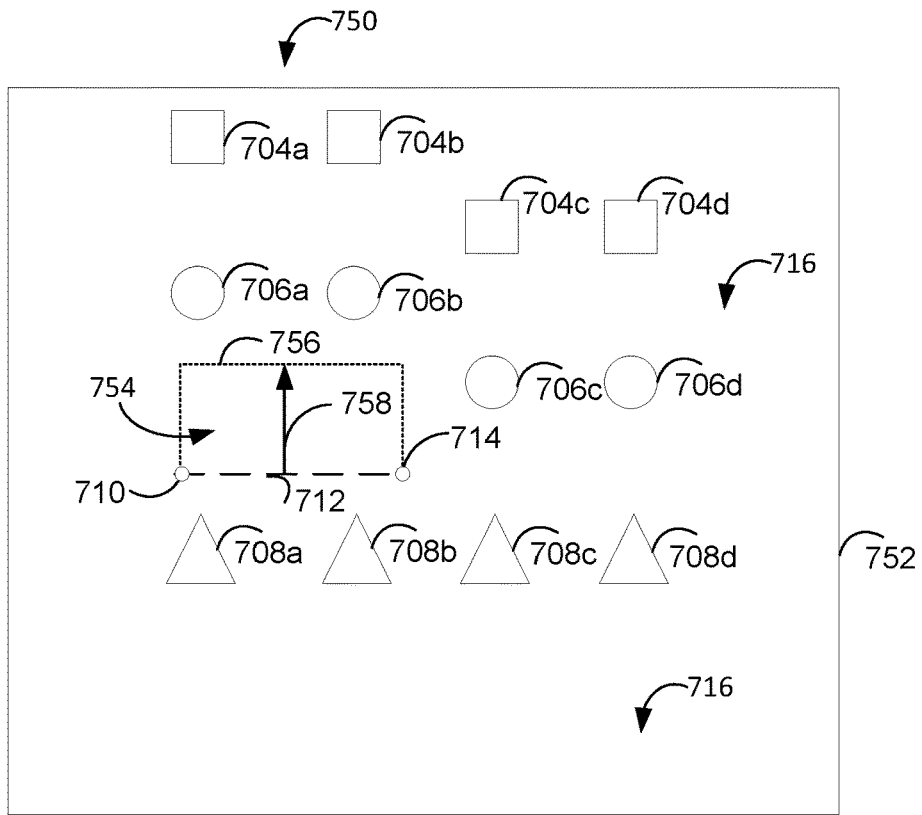

Referring to FIGS. 7A and 7B which illustrate a user interface involving a third method of expanding a digital canvas 716. The user inputs a slice gesture that corresponds to slice line 712 including a start point 710 and an end point 714. In this third method of expanding a digital canvas, after the slice gesture, the user may use a shift gesture. The shift line 758 corresponds in length and direction proportionally to the shift gesture. In this manner, the user may appear to expand a canvas by cutting and then pushing or pulling new canvas from the slice line.

In FIG. 7B, the canvas expansion 754 is a rectangle defined on one side by the slice line and defined in width by the length of the shift line. While a rectangle is shown for canvas expansion 754, it is recognized that the canvas expansion may be a parallelogram or a trapezoid shape depending on the orientation of the shift line.

Once the slice gesture is made, the user interface may display the slice line in the viewport 752. Once displayed, the user may expand the canvas using another gesture. The expansion may be animated, so that the user may receive visual feedback about the canvas expansion prior to completing the shift gesture.

When the shift is applied, and the canvas is expanded at 754, it is noted that the squares 704a and 704b and the circles 706a and 706b also translate according to the canvas expansion 754. As stated before, the canvas 716 may be larger than the viewport 752, and the expansion of the canvas may extend a region from inside the viewport 752 to outside the viewport. The slice line 712 is shown as generally horizontal, however it may be of any size or direction. Objects including squares 704c, 704d, circles 706c, 706d and triangles 708a, 708b, 708c, and 708d do not translate according to the canvas expansion 754 and remain.

Figure 8:
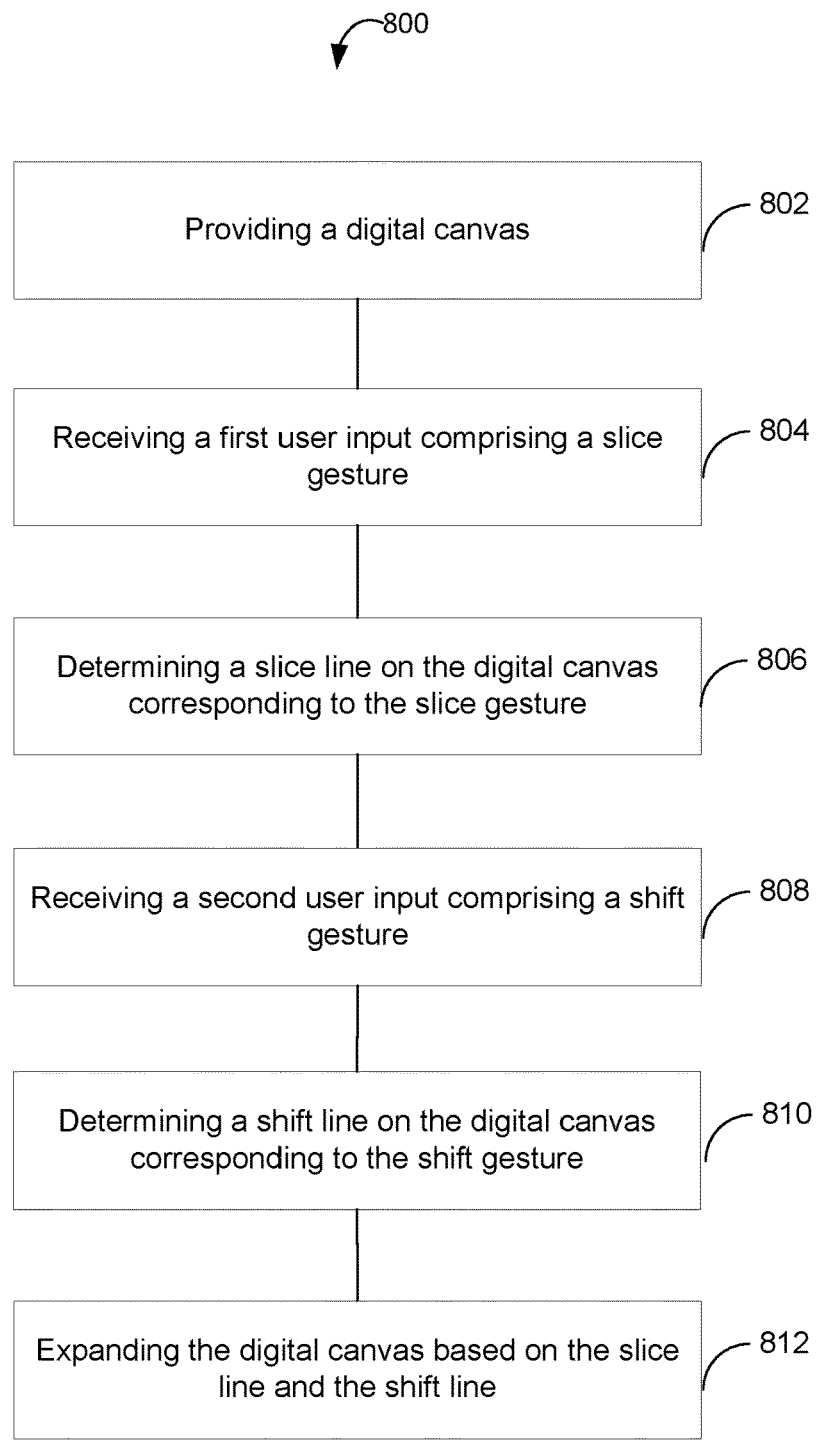
FIG. 8 is a flow diagram showing a method of expanding a digital canvas in accordance with an example embodiment.

Referring to FIG. 8, which illustrates a flow diagram for the method of canvas expansion shown in FIGS. 7A-7B. At 802, a digital canvas is provided that the user may interact with using a variety of different input methods. The digital canvas may combine an input device with a display device. The canvas may be viewed through a viewport on the display device, but the canvas may be larger than the viewport itself. The expansion of the canvas may also change the shape of the canvas, and may translate a portion of the canvas inside the viewport to outside the viewport.

At 804, a user interacts with the display device using the user input device. The first user input may be a slice gesture that is recognized by the drawing application. The slice gesture may be a motion on a touch surface such as a swipe, or may be a gesture from a pointing device like a mouse. In the case that the slice gesture is made using a pointing device, the start point may be determined by a mouse button down event and the end point may be determined from a mouse button up event. The first user input may be a series of points associated with the gesture.

At 806, the slice line may be determined on the canvas from the first user input. The first user input may be a series of points within the viewport including a start point and an end point, and these points may operate to describe the slice line. The slice line may be generally straight or it may be curved.

At 808, a user interacts with the display device using the user input device. The second user input may be a shift gesture that is recognized by the drawing application. The shift gesture may be a motion on a touch surface such as a swipe or an extended user touch event, or may be a gesture from a pointing device like a mouse. In the case that the slice gesture is made using a pointing device, the start point may be determined by a mouse button down event and the end point may be determined from a mouse button up event. The second user input may be a series of points associated with the gesture.

At 810, the shift line may be determined on the canvas from the second user input. The second user input may be a series of points within the viewport including a start point and an end point, and these points may operate to describe the shift line. The determination of the shift line may involve a linear regression of the series of points associated with the second user input. As such, the shift line may be generally straight.

At 812, the canvas is expanded along the slice line by a canvas expansion having a length generally equal to the length of the slice line and a width generally equal to the length of the shift line. The size of the canvas expansion may be therefore selected by the user based on the shift gesture. The canvas may be dynamically updated during the second input gesture such that the user may preview the canvas resulting from the canvas expansion during the touch event.

Figure 9A:
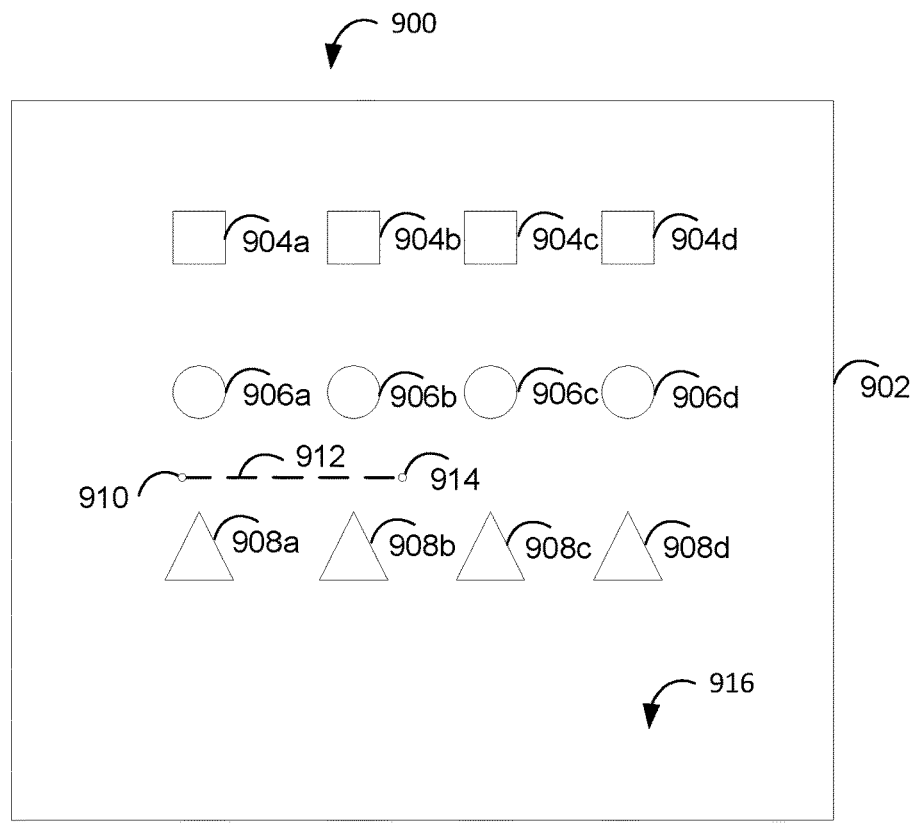
FIGS. 9A-9B are user interface diagrams of a canvas in accordance with an example embodiment.
Figure 9B:
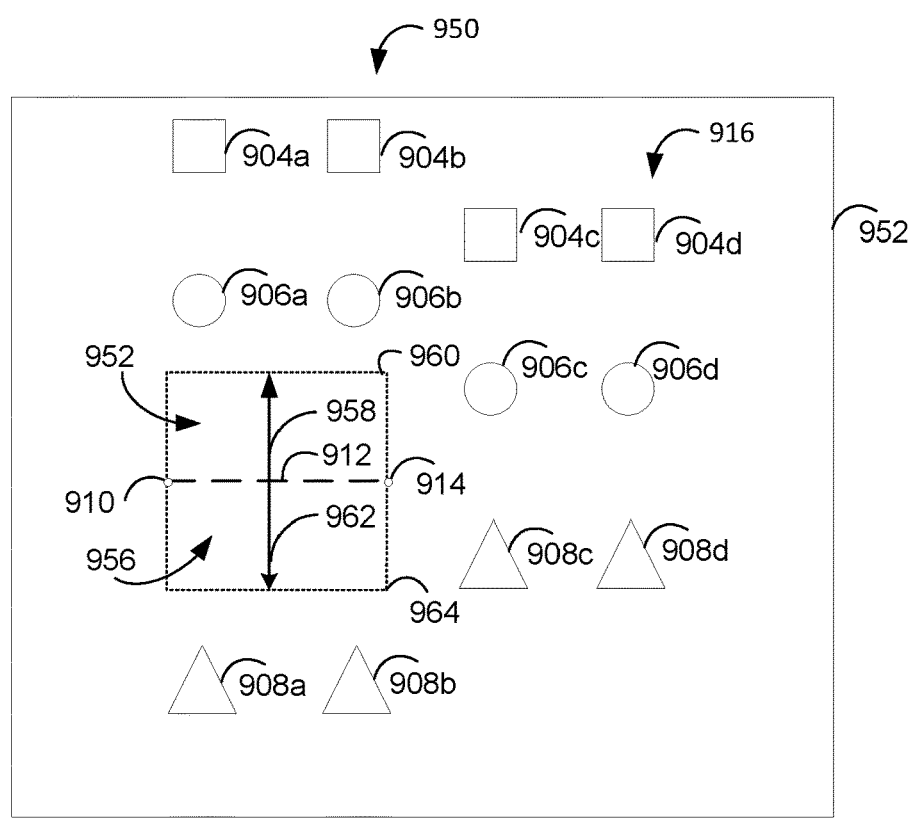

Referring now to FIGS. 9A and 9B, which illustrate a user interface involving a fourth method of expanding a digital canvas 916. The user inputs a slice gesture that corresponds to slice line 912 including a start point 910 and an end point 914. In this fourth method of expanding a digital canvas, after the slice gesture, the user may use a pair of shift gestures, such as a pinch gesture using two fingers on a touch interface. The pinch gesture may involve receiving input from the input device for both shift gestures substantially simultaneously, and therefore may require simultaneous determination of the first shift line 958 and second shift line 962. The first shift line 958 may correspond in length and direction proportionally to a single finger input of a pinch gesture. The second shift line 962 may correspond in length and direction proportionally to a single finger input of a pinch gesture. The second shift line 962 may be generally opposite in direction to the first shift line 958. In this manner, the user may appear to expand a canvas by cutting and then pinching new canvas from the slice line.

In FIG. 9B, the canvas expansion 952 may be a rectangle defined on one side by the slice line 912 and defined in width by the length of the first shift line 958. The canvas expansion 956 may be a rectangle defined on one side by the slice line 912 and defined in width by the length of the second shift line 962. While a rectangle is shown for canvas expansions 952 and 956, it is recognized that the canvas expansion may be a parallelogram or a trapezoid shape depending on the orientation of the shift line.

Once the slice gesture is made, the user interface may display the slice line 912 in the viewport 952. Once displayed, the user may expand the canvas using another gesture. The expansion may be animated, so that the user may receive visual feedback about the canvas expansions prior to completing the shift gestures.

When the shift is applied, and the canvas is expanded at 952 and 956, it is noted that the squares 904a and 904b, and the circles 906a and 906b may translate according to canvas expansion 952. Similarly, the triangles 908a and 908b may also translate according to the canvas expansion 956. As stated before, the canvas 916 may be larger than the viewport 952, and the expansion of the canvas may extend a region from inside the viewport 952 to outside the viewport. The slice line 912 is shown as generally horizontal, however it may be of any size or direction. Objects including squares 904c, 904d, circles 906c, 906d and triangles 908c, and 908d do not translate according to the canvas expansions 952 and 956 and remain.

Figure 10:
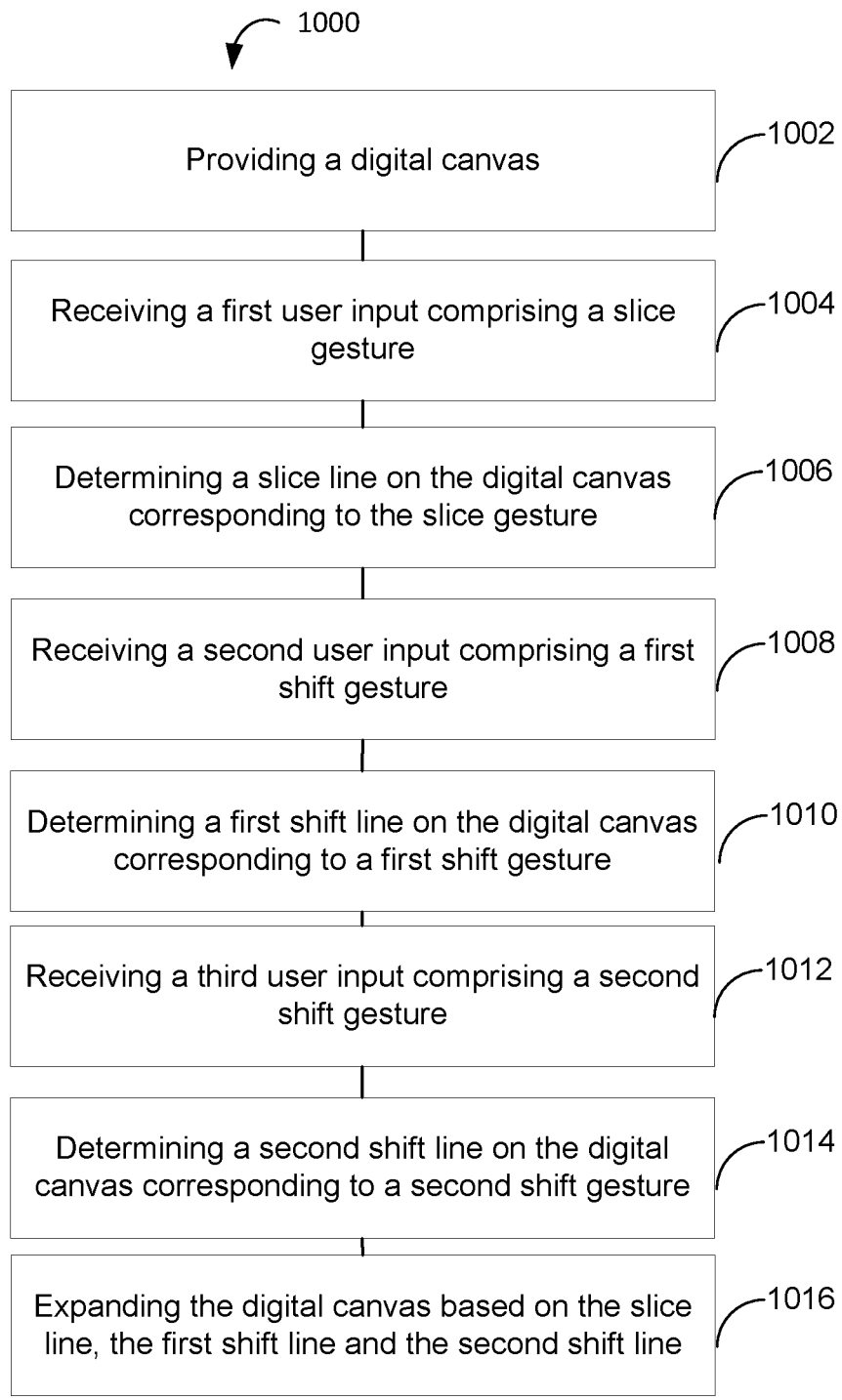
FIG. 10 is a flow diagram showing a method of expanding a digital canvas in accordance with an example embodiment.

Referring to FIG. 10, which illustrates a flow diagram for the method of canvas expansion shown in FIGS. 9A-9B. At 1002, a digital canvas is provided that the user may interact with using a variety of different input methods. The digital canvas may combine an input device with a display device. The canvas may be viewed through a viewport on the display device, but the canvas may be larger than the viewport itself. The expansion of the canvas may also change the shape of the canvas, and may translate a portion of the canvas inside the viewport to outside the viewport.

At 1004, a user interacts with the display device using the user input device. The first user input may be a slice gesture that is recognized by the drawing application. The slice gesture may be a motion on a touch surface such as a swipe, or may be a gesture from a pointing device like a mouse. In the case that the slice gesture is made using a pointing device, the start point may be determined by a mouse button down event and the end point may be determined from a mouse button up event. The first user input may be a series of points associated with the gesture.

At 1006, the slice line may be determined on the canvas from the first user input. The first user input may be a series of points within the viewport including a start point and an end point, and these points may operate to describe the slice line. The slice line may be generally straight or it may be curved.

At 1008, a user interacts with the display device using the user input device. The second user input may be a first shift gesture that is recognized by the drawing application. The first shift gesture may be a motion on a touch surface such as a swipe or an extended user touch event, or may be a gesture from a pointing device like a mouse. In the case that the first slice gesture is made using a pointing device, the start point may be determined by a mouse button down event and the end point may be determined from a mouse button up event. The second user input may be a series of points associated with the gesture.

At 1010, the first shift line may be determined on the canvas from the second user input. The second user input may be a series of points within the viewport including a start point and an end point, and these points may operate to describe the first shift line. The determination of the first shift line may involve a linear regression of the series of points associated with the second user input. As such, the first shift line may be generally straight.

At 1012, a user interacts with the display device using the user input device. The third user input may be a second shift gesture that is recognized by the drawing application. The second shift gesture may be a motion on a touch surface such as a swipe or an extended user touch event, or may be a gesture from a pointing device like a mouse. In the case that the second slice gesture is made using a pointing device, the start point may be determined by a mouse button down event and the end point may be determined from a mouse button up event. The third user input may be a series of points associated with the gesture.

At 1014, the second shift line may be determined on the canvas from the third user input. The third user input may be a series of points within the viewport including a start point and an end point, and these points may operate to describe the second shift line. The determination of the second shift line may involve a linear regression of the series of points associated with the third user input. As such, the second shift line may be generally straight.

Optionally, in the case of a touch interface the second user input and the third user input may occur substantially simultaneously, i.e. in a "pinch" gesture where a user places two fingers on the touch surface and then moves them apart. In FIG. 10, some steps may therefore function simultaneously to allow a user to make the first shift gesture and the second shift gesture at the same time.

At 1016, the canvas may be expanded along the slice line by a first canvas expansion having a length generally equal to the length of the slice line and a width generally equal to the length of the first shift line. The canvas may also be expanded along the slice line by a second canvas expansion having a length generally equal to the length of the slice line and a width generally equal to the length of the second shift line. The first shift line and the second shift line may generally be in opposite directions. The size of the first canvas expansion and the second canvas expansion may be therefore selected by the user based on the first shift gesture and the second shift gesture. The first canvas expansion and the second canvas expansion may be of different sizes depending on user preference. The canvas may be dynamically updated during the first shift gesture and the second shift gesture such that the user may preview the canvas resulting from the canvas expansion during the touch event.

Figure 11A:
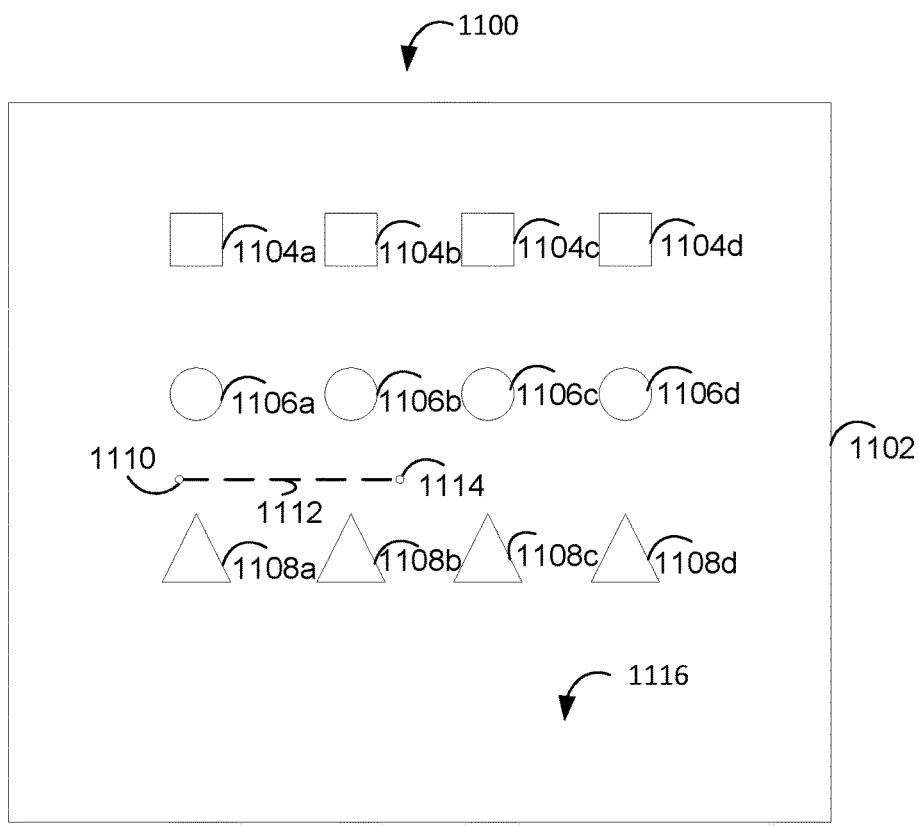
FIGS. 11A-11B are user interface diagrams of a canvas in accordance with an example embodiment.
Figure 11B:
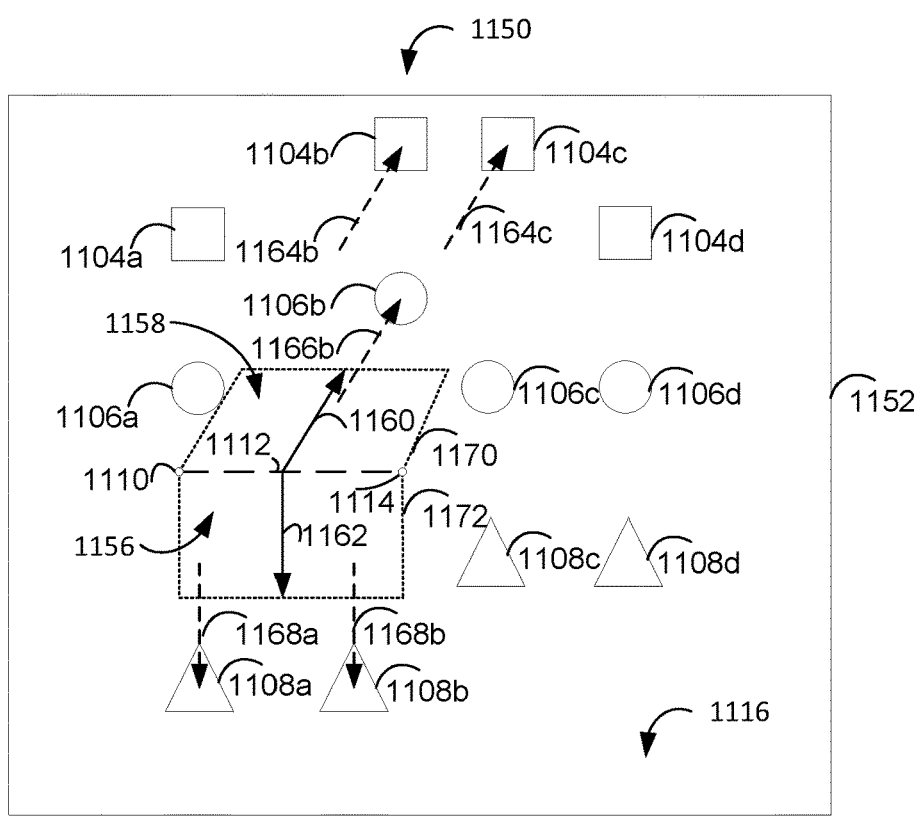

Referring now to FIGS. 11A and 11B, which illustrate a user interface involving a fifth method of expanding a digital canvas 1116. The user inputs a slice gesture that corresponds to slice line 1112 including a start point 1110 and an end point 1114. In this fifth method of expanding a digital canvas, after the slice gesture, the user may use a pair of shift gestures, such as a pinch gesture using two fingers on a touch interface. The pinch gesture may involve receiving input from the input device for both shift gestures substantially simultaneously, and therefore may require simultaneous determination of the first shift line 1160 and second shift line 1162. The first shift line 1160 may correspond in length and direction proportionally to a single finger input of a pinch gesture. The second shift line 1162 may correspond in length and direction proportionally to a single finger input of a pinch gesture. The second shift line 1162 in FIG. 11B may be offset from the line opposite from the first shift line 1160 and the canvas expansion 1158 may be a parallelogram. In this manner, the user may appear to expand a canvas by cutting and then pinching new canvas from the slice line.

In FIG. 11B, the canvas expansion 1158 may be a parallelogram defined on one side by the slice line 1112 and defined in width by the length of the first shift line 1160. The offset angle of the first shift line 1160 from the line opposite the second shift line may similarly define the shape of the parallelogram. The canvas expansion 1156 may be a rectangle defined on one side by the slice line 1112 and defined in width by the length of the second shift line 1162. While a rectangle is shown for canvas expansion 1156, it is recognized that the canvas expansion may be a parallelogram or a trapezoid shape depending on the orientation of the second shift line.

Once the slice gesture is made, the user interface may display the slice line 1112 in the viewport 1152. Once displayed, the user may expand the canvas using another gesture. The expansion may be animated, so that the user may receive visual feedback about the canvas expansions prior to completing the shift gestures.

When the shift is applied, and the canvas is expanded at 1156 and 1158, it is noted that the squares 1104b and 1104c, and circle 1106b may translate according to canvas expansion 1158. Similarly, the triangles 1108a and 1108b may also translate according to the canvas expansion 1156. As stated before, the canvas 1116 may be larger than the viewport 1152, and the expansion of the canvas may extend a region from inside the viewport 1152 to outside the viewport. The slice line 1112 is shown as generally horizontal, however it may be of any size or direction. Objects including squares 1104a and 1104d, circles 1106a, 1106c, and 1106d and triangles 1108c, and 1108d do not translate according to the canvas expansions 1156 and 1158 and remain.

Optionally, a shape such as a square, a rectangle, or a triangle or the like may be made up of at least two points. An object or shape on a digital canvas may straddle a portion of canvas affected by a canvas expansion. In one embodiment, the canvas expansion may result in the translation of at least one of the at least two points in the shape and the object or shape may stretch in shape.

Optionally, a shape such as a square, a rectangle, or a triangle or the like may be made up of at least two points. An object or shape on a digital canvas may straddle a portion of canvas affected by a canvas expansion. In another embodiment, the canvas expansion may shear the object along the boundary line and create two new objects comprising the two halves of the cleaved object.

Reference made to FIGS. 12A, 12B, 13, and 14 where a system for expanding a canvas is disclosed. This system may use radiation intensity signals arranged around a display device and a plurality of radiation sensors to determine the location of a radiation blocking member such as a stylus or a finger.

Figure 12A:
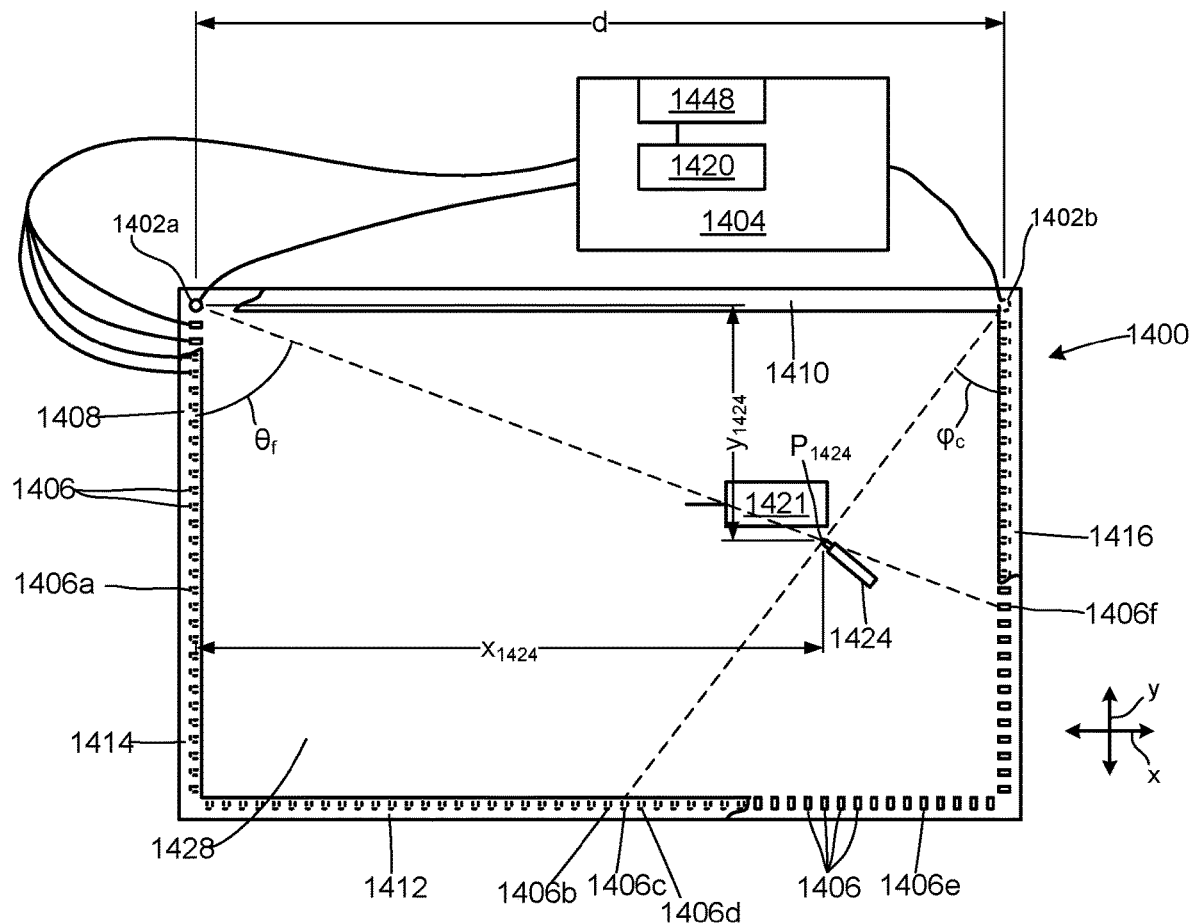
FIG. 12A illustrates a system of expanding a digital canvas in according with an example embodiment.

FIG. 12A illustrates a system 1400 for sensing or estimating the position of a radiation blocking object 1424. System 1400 includes a pair of radiation sensors 1402a, 1402b, a controller 1404 and a plurality of radiation sources 1406 mounted on a frame or housing 1408. Frame 1408 has a top side 1410, bottom side 1412, left side 1414 and a right side 1416. In this embodiment, radiation sources 1406 are mounted on the left, bottom and right sides of frame 1408. Radiation sensor 1402a is mounted at the top left corner of the frame 1408 and radiation sensor 1402b is mounted at the top right corner of the frame 1408.

Frame 1408 surrounds a surface 1428. In various embodiments, the surface 1428 may be the surface of a display screen, a writing surface or another surface. In this embodiment, frame 1408 provides a bezel at the edges of the surface 1428. Radiation sources 1406 and radiation sensors 1402 are mounted within the bezel. In some embodiments, the frame may only partially surround or enclose the surface, for example, the frame may not enclose the top edge of the surface if no radiation sensors or sources are mounted adjacent the top edge. In other embodiments, the frame may support but not enclose the surface. For example, the frame may provide a support for the surface, radiation sensors and radiation sources, but may not have a bezel or other element that surrounds the surface. In other embodiments, the frame may itself provide some or all of the surface. For example, the frame may have solid surface between its edges and radiation blocking objects may be positioned on the solid surface when system 1400 is in use. Typically, as in these examples, the surface will be mounted to the frame.

The top left corner of frame 1408 is cut away in FIG. 12A to reveal radiation sensor 1402a and several radiation sources 1406. The bottom right corner of frame 1408 is also cut away to reveal some of the radiation sources 1406. Each radiation source 1406, in this embodiment, is a LED that emits radiation in the infra-red spectrum. In other embodiments, the radiation sources may be various types of sources that emit radiation in other spectrums, including the visible light spectrum and the UV spectrum. Radiation sources 1406 are mounted on frame 1408 such that radiation from the radiation sources reaches one or both of the radiation sensors 1402. In this embodiment, radiation sources are equally spaced along the left, bottom and right sides of frame 1408. In this embodiment, frame 1408 is rectangular with square corners. The sides of frame 1408 are parallel to the axes of an x-y plane. In some embodiments, the radiation sources may not be equally spaced. In some embodiments, the frame may have a non-rectangular shape.

Controller 1404 includes a processor 1420, which may any type of device or component capable of operating system 1400, including a hardware component, a software component or a component including both hardware and software or firmware or both. For example, processor 1420 may be a microprocessor, microcontroller, gate array or any type of data processing or computing device. The processor can be programmed or configured to operate system 1400 and its components and to communicate with external devices. Controller 1404 may also includes a memory 1421, which may be accessed by processor 1420. Processor 1420 controls the operation of controller 1404 and system 1400. Instructions may be recorded in the memory 1421, and may be loaded into the processor to configure the processor to perform control, data processing, data transformation and communication operations for controlling the operation of the controller 1404 and the system 1400 as described below. Controller 1404 is coupled to each radiation source 1406. Only some of these connections are illustrated in FIG. 12A. Controller 1404 is capable of activating each radiation source 1406 independently so that when one radiation source is activated or on (i.e. emitting radiation) the remaining radiation sources are not activated or off (i.e. not emitting radiation).

In this embodiment, each radiation sensor 1402 is a PIN photodiode that is capable of sensing radiation emitted by the radiation sources 1406 on the two opposing sides of frame 1408. Radiation sensor 1402*a* senses radiation emitted by the radiation sources 1406 on the bottom and right sides of frame 1408. Radiation sensor 1402*b* senses radiation emitted by the radiation sources 1406 on the bottom and left sides of frame 1408. Each radiation sensor 1402 is coupled to controller 1404 and provides a radiation intensity level to the controller corresponding to the intensity of radiation falling on the radiation sensor 1402 at any particular time. The radiation intensity level has a relatively high value when the corresponding radiation sensor 1402 is receiving radiation from a radiation source 1406 and a relatively low value when the corresponding radiation sensor 1402 is not receiving radiation from a radiation source 1406. A series of radiation intensity levels corresponding to the radiation sources 1406 may be combined into a radiation intensity signal that can be used to estimate the position of the radiation blocking object 1424. This is explained below.

In other embodiments each radiation sensor may be any device that is responsive to the radiation emitted by the radiation sources and capable of providing a radiation intensity level corresponding to radiation incident on the sensor. For example, a light sensitive element such as a photosensor, photodiode, photocell, a solar cell or a photovoltaic cell may be used to provide radiation intensity levels. The radiation sensor may provide the output radiation intensity level in any format compatible with the controller 1404, including a digital or analog format.

Controller 1404 is programmed with the dimensions of frame 1408, the position of each radiation source 1406 and the positions of each radiation sensor 1402. In this example, controller 1404 is programmed with the following information:

Sensors 1402*a* and 1402*b* are separated by a distance d. Radiation sensor 1402*a* is at the (0,0) position on the x-y plane and radiation sensor 1402*b* is at the (d,0) position on the x-plane.

For each radiation source on the bottom or right side of the frame 1408, the angle between the left side of the frame (or a line parallel to the left side of the frame, depending on the position of the radiation sensor 1402*a*) and the path between radiation sensor 1402*a* and the radiation source, or a value corresponding to the angle.

For each radiation source on the left or bottom side of the frame 1408, the angle between the right side of the frame (or a line parallel to the right side of the frame, depending on the position of the radiation sensor 1402*b*) and the path between radiation sensor 1402*b* and the radiation source, or a value corresponding to the angle.

Under the control of controller 1404, system 1400 is operable to estimate the physical position $P_{1424a}(x_{1424a}, y_{1424a})$ of radiation blocking object 1424. In FIG. 12A, radiation blocking object 1424 is illustrated as a stylus. The tip of the stylus is in contact with the surface 1428, at point $P_{1424}$, which corresponds to the physical position $P_{1424a}$ discussed here and the pixel position $P_{1424d}$ discussed below.

In operation, controller 1404 sequentially activates the radiation sources 1406. While a radiation source 1406 is activated, controller 1404 samples the output from one or both of the radiation sensors 1402 to obtain a radiation intensity level corresponding to the intensity of radiation incident on each radiation sensor 1402. Typically, the path between the radiation source and each radiation sensor will be blocked, partially blocked (ie. partially attenuated) or clear. In some embodiments, while a radiation source 1406 is activated, the controller may only check the radiation intensity level for a radiation sensor 1402 if there is a direct path between the radiation source 1406 and the radiation sensor 1402. For example, there is a direct path between radiation sensor 1402*a* and the radiation sources 1406 on the bottom side 1412 and the right side 1416 of frame 1408. Similarly, there is a direct path between radiation sources 1406 on the left side 1414 and the bottom side 1412 of the frame 1408 and radiation source 1402*b*. In other embodiments, the controller 1404 may check the radiation intensity level at a radiation sensor 1402 even when the activated radiation source 1406 does not have a direct path to the radiation sensor.

Instructions for performing this process are recorded in memory 1421. Processor 1420 accesses the instructions in memory 1421 an executes the instructions to perform the process described above and those described below. Processor 1420 may also record data in memory 1421 during the performance of this process.

In other embodiments, the specific placement of the radiation sources and radiation sensors and the shape of the frame (which need not be rectangular and may have another shape) will effect which radiation sources have a direct path to which radiation sensors.

Returning to the present embodiment, when radiation source 1406*a* is activated, controller 1404 need not sample radiation sensor 1402*a* to obtain a radiation intensity level because there is no direct path between radiation source 1406*a* and radiation sensor 1402*a* that is not obstructed by other radiation sources 1406. Controller 1404 does sample the radiation intensity level provided by radiation sensor 1402*b*, which will have a relatively high value indicating that the path between radiation source 1406*a* and radiation sensor 1402*b* is clear, or not blocked.

When radiation source 1406*c* is activated, controller 1404 samples both radiation sensors 1402*a* and 1402*b*. The radiation intensity level from radiation sensor 1402*a* is relatively high, indicating that the path between radiation source 1406*c* and radiation sensor 1402*a* is clear. The radiation intensity level from radiation sensor 1402*b* is relatively low, indicating that the path between radiation source 1406*c* and radiation sensor 1402*b* is blocked, in this example, by radiation blocking object 1424.

When radiation source 1406*e* is activated, the radiation intensity levels from radiation sensors 1402*a* and 1402*b* respectively indicate that the paths between radiation source 1406*e* and radiation sensors 1402*a* and 1402*b* are clear.

When radiation source 1406*f* is activated, controller 1404 samples the radiation intensity level from radiation source 1402*a* which indicates that the path between radiation source 1406*f* and radiation sensor 1402*a* is blocked by radiation blocking object 1424. Controller 1404 samples the radiation intensity level from radiation sensor 1402*b*, which indicates that the path between radiation source 1406*f* and radiation sensor 1402*a* is clear.

As controller 1404 sequentially activates the radiation sources and samples the radiation intensity levels corresponding to each radiation source 1406, controller 1404 records the outcomes as follows:

| Radiation source | Path to Radiation Sensor 1402a | Path to Radiation Sensor 1402b |
|---|---|---|
| . . . | . . . | . . . |
| 1406a | — | Clear |
| . . . | . . . | . . . |
| 1406c | Clear | Blocked |
| . . . | . . . | . . . |
| 1406e | Clear | Clear |
| . . . | . . . | . . . |
| 1406f | Blocked | — |
| . . . | . . . | — |

Figure 12B:
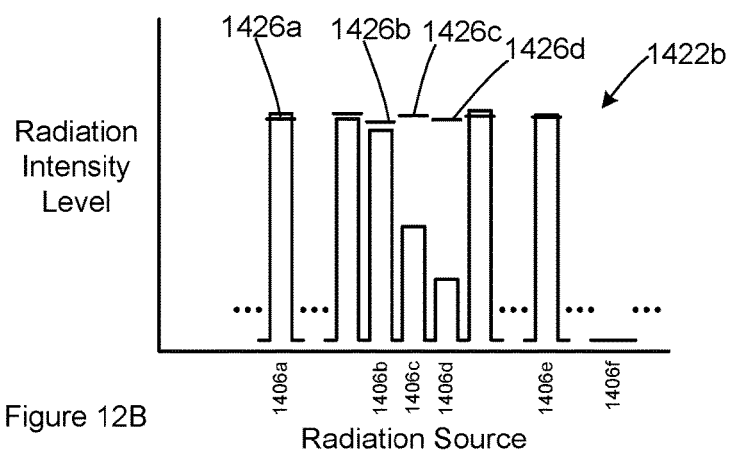
FIG. 12B illustrates a radiation intensity signal in according with an example embodiment.

Reference is made to FIGS. 12A and 12B. In another embodiment, the controller 1404 is configured or programmed differently to estimate the position $P_{1424a}$ of the radiation blocking object 1424 in a different manner. In this embodiment, the intensity signals 1422 are used to more precisely estimate the angular position of the radiation blocking object 1424 relative to each radiation sensor 1402 and a side of the frame 1408.

FIG. 12B illustrates a portion of a radiation intensity signal 1422*b* when controller 1404 is configured according to this embodiment. In this embodiment, the controller 1404 establishes a baseline intensity level for each radiation source in combination with each radiation sensor. For each radiation source, controller 1404 samples the radiation intensity level from radiation sensor 1402*b* while the radiation source is on, and in the absence of a radiation blocking object to generate a baseline intensity level 1426. The baseline intensity levels for radiation source 1406*a* and 1406*b*-106*d* are shown.

In this embodiment, during startup of system, the baseline intensity level is initially determined for each radiation source, with respect to each radiation sensor from which the radiation source is visible (i.e. if there is a direct path between the radiation source and the radiation sensor). An initial set of samples of the intensity signal are discarded while the system is starting up. For a selected time period following this initial start-up period, the radiation intensity level is sampled while the radiation source is on. The radiation intensity level is recorded and an average intensity level is determined for the radiation source at each radiation sensor. For example, if each radiation source is activated 50 times per second, the baseline intensity level may be calculated using the first 25 samples for each radiation source, at each radiation sensor, representing half of a second. In other embodiments, the baseline intensity level may be calculated over more or fewer samples, or for a longer period or shorter period. The baseline intensity level for each radiation sensor inherently takes into account ambient and other conditions affecting the amount of radiation that reaches the radiation sensor when a particular radiation source is switched on. Such other conditions include the amount of radiation emitted by each radiation source, the physical distance between the radiation source and the radiation sensor and may also include the manner in which system 1400 is used.

The baseline intensity level calculated for each radiation source 1406, with respect to each radiation sensor 1402, may be updated over time. For example, a moving average of some of the radiation intensity readings over a recent time period may be calculated to refine the baseline level as ambient and other conditions change. Some radiation intensity readings may not be used to calculate the updated baseline intensity level. For example, every tenth or twentieth radiation intensity reading may be used to calculate the moving average for each baseline intensity level. This reduces the amount of data that must be stored to calculate a baseline intensity level corresponding to a longer time period and also reduces the computation time required in the controller to address this task. Typically, the baseline intensity level will be calculated for a recent period from a part of a second to a few seconds or tens of seconds. When the path between a radiation source 1406 and a radiation sensor 1402 is blocked the radiation intensity level for that source at that sensor will be significantly reduced, although ambient radiation and some radiation may still reach the radiation sensor around the radiation blocking object. The controller may exclude radiation intensity levels below a certain threshold compared to the current baseline intensity level when refining the baseline intensity as is further described below. Various other methods for calculating a baseline intensity level for each radiation source at each radiation sensor may also be used. In some embodiments, one baseline intensity level may be calculated for a group or all of the radiation sensors. In other embodiments a pre-determined intensity level may be used as the baseline intensity level for some or all of the radiation sources.

In this embodiment, each time a radiation source 1406 is activated, the radiation intensity level from each radiation sensor 1402 from which the radiation source is visible is sampled and compared to the existing baseline intensity level for that radiation source at that radiation sensor. If the current intensity level is more than some threshold below the baseline intensity level, the percentage difference from the baseline level is calculated. For example, the threshold may be 90% of the baseline intensity level. If the current intensity level is greater than 90% of the baseline level, the current intensity level may be used to further refine the baseline level, or it may be discarded. If it is less than 90% of the baseline level, the processor assumes that the path between the radiation source 1406 and the radiation sensor 1402 is at least partially blocked. In other embodiments, other threshold levels may be used.

The controller successively activates the radiation sources in a cyclic process. After each cycle of switching on the radiation sources 1406 and measuring the radiation intensity level from each radiation sensor for the radiation sources, the controller estimates the position of the radiation blocking object.

FIG. 12B illustrates the attenuation of several radiation sources 1406 relative to their respective baseline levels 1426. The current intensity level for radiation source 106*a*, as measured at radiation sensor 1402 is greater than 90% of the baseline intensity level 1426*a*, so it is ignored for the purpose of estimating the position of the radiation blocking object 1424, although the current intensity level may be used to refine the baseline level for radiation source 1406*a* as measured at radiation sensor 1402*b*. Similarly, the current intensity level for radiation source 1406*b* is greater than 90% of baseline intensity level 1426*b*, so it is ignored for the purpose of estimating the position of the radiation blocking element, but may be used to refine the baseline level, which would then be slightly higher.

The current intensity levels for radiation sources 1406*c* and 1460*d* are below 90% of their respective baseline intensity levels 1426*c* and 1426*d*. The current intensity level for radiation source 1406*c* is at 53% of baseline intensity level 1426c. The current intensity level for radiation source 1406d is at 31% of the baseline intensity level 1426d. Controller 1404 normalizes these deviations to a total of 100%: the relative attenuation of radiation from radiation source 1406c represents 63% of the total attenuation (31%/84%=63%); and the relative attenuation of radiation from radiation source 1406d represents 37% of the total attenuation.

The angle φ between the right side 1416 and a line 1432 between radiation source 1402b and radiation blocking object 1424 is then estimated as follows. The angle $\varphi_c$ for radiation source 1406c is 44°. The angle $\varphi_d$ (not shown) corresponding to radiation source 1406d is 42°. In this embodiment, rather than recording the angles themselves, the tan of each angle is recorded. The tan of the angle $\varphi_{124}$ between the left side of the frame 108 and the path between radiation sensor 1402b and radiation blocking object 1424 can then be estimated as follows:

$$\text{Tan}(\varphi_{124}) = 0.63 \cdot \tan(44°) + 0.37 \cdot \tan(42°)$$

$$= 0.9415.$$

Angle $\varphi_{124}$ is 43.27°

In an embodiment in which the angles themselves are recorded, angle $\varphi_{124}$ may be estimated as follows:

$$\varphi_{124} = 0.63 \cdot 44° + 0.37 \cdot 42°$$

$$= 43.26°.$$

The estimates of angle $\varphi_{124}$ differ due to the non-linearity between an angle and its tangent.

An angle 8124 is calculated for the angle between left side 1414 and the line between radiation sensor 1402a and the radiation blocking object 1424. The two calculated angles $\varphi_{124}$ and $\theta_{124}$ are used to estimate the position $(x_b, y_b)$ of the radiation blocking object 1424.

In this manner, controller 1404 may use the attenuation of two or more radiation sources as measured at one of the radiation sensors to estimate the angular position of radiation blocking object relative to the left or right side of the frame 1408 and one of the radiation sensors 1402 by normalizing the relative attenuations of the different radiation sources and then calculating a weighted average of the angle of those sources from the relevant side of the frame and the radiation sensor.

This embodiment may allow the position of the radiation blocking object 1424 to be estimated more accurately than the first embodiment by allowing angles θ and φ to be estimated between the specific angles at which the radiation sources 1406 are positioned.

In some embodiments, it may be desirable to create a baseline range of intensity for each radiation source to account for ambient radiation. For example, in some embodiments, ambient radiation may be sensed by a radiation sensor, with the result that the radiation intensity level provided by a radiation sensor may measure both radiation from a radiation source and from ambient radiation. Controller 1404 may be configured to determine the radiation intensity level at each radiation sensor 1402 while all of the radiation sources 1406 are switched off, thereby establishing an ambient radiation level for each radiation sensor 1402. Each ambient radiation level may be an average of a group of samples, it may be a moving average of recently obtained samples or may be calculated in another manner. In some cases, the amount of ambient radiation incident on a radiation sensor may vary over time. It may be desirable to periodically sample ambient radiation at each radiation sensor to update the ambient radiation level. In some embodiments, it may be desirable to obtain an ambient radiation level for each radiation sensor with all of the radiation sources off immediately before (or after) obtaining a radiation intensity level with a radiation source turned on.

The ambient radiation level may be used to scale or otherwise adjust the radiation intensity level to remove or reduce the effect of ambient radiation on the estimated positions of a radiation blocking object. For example, the ambient radiation level (or an amount based on the ambient radiation level) may be subtracted from both the baseline intensity level 1426 and the measured radiation intensity level for each radiation source before analyzing a radiation intensity signal and estimating the position of radiation blocking object.

System 1400 may be used in various configurations to identify the position of various types of radiation blocking objects 1424. For example, system 1400 may be used with a whiteboard or other display surface. Frame 1408 may be attached to the edge or frame of the whiteboard, or may also be the frame of the whiteboard. The radiation blocking object 1424 may be a pen used to write on the whiteboard and as the pen is moved about the surface of the whiteboard, its position is estimated by controller 1404. Controller 1404 may be coupled to (or may be part of) a whiteboard system for recording estimates of the pen's position. By recording successive estimates of the pen's position, information on the whiteboard may be recreated in an electronic form and may be recorded for subsequent use, and it may be displayed or printed. The whiteboard system may include software to calculate the path of movement of the pen between estimated positions and to smooth the calculated path.

As the pen is used to write on the whiteboard, the ink on the whiteboard may change the amount of ambient light reflected on to a radiation sensor 1402 and could also change the amount of radiation propagating from a radiation source 1406 to a radiation sensor 1402, thereby affecting the level of the radiation intensity measured for some or all of the radiation sources 1406. In such embodiments, periodically updating the baseline intensity level for some or all of the radiation sources may improve the accuracy of estimates of the position of a radiation blocking object.

In other embodiments, system 1400 may be used with a display monitor or screen to form a touchscreen. Frame 1408 may be mounted to the display monitor or may be part of the display monitor's housing. The radiation blocking object 1424 in this case may be a finger, and as a person moves their finger onto or off of the display monitor, the presence of the finger is detected and its position on the display screen is estimated by controller 1404. Controller 1404 may be coupled to (or may be part of) a touch screen system (which would also include the display monitor) and may provide estimates of the finger's position to the touch screen system. As a finger is moved about on the display screen, successive estimates of the finger's position can be recorded in the touch screen system to provide an electronic record of the finger's movement and the estimated positions can be displayed on the display monitor. The touch screen system may include software or other components to calculate the path of movement of the finger between its successive estimated positions and to smooth the calculated path. Such a touch screen system, in combination with system 1400, would effectively allow a user to write or draw on the display monitor, or to manipulate objects displayed on the display monitor, using the person's finger.

In a touch screen system, the radiation sources 106 and radiation sensors 1402 may be located relatively close to the display screen and the amount of radiation incident on the radiation sensors may vary as the information displayed on the display screen changes. In such embodiments, it may also be beneficial to update the baseline intensity level for some or all of the radiation sources.

Figure 13:
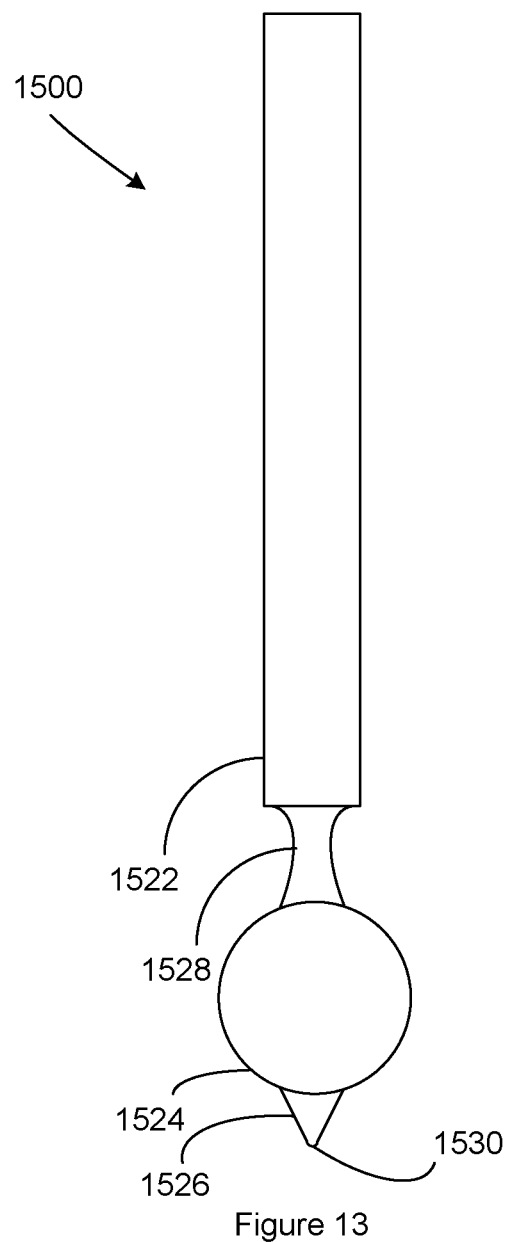
FIG. 13 illustrates an embodiment of a stylus.

Referring to FIG. 13, there is provided a side view diagram that illustrates a radiation blocking stylus 1500 in accordance with at least some embodiments described herein. The radiation blocking stylus 1500 comprises a handle that includes a grip portion 1522 and a narrow portion 1528, a radiation blocking member 1524, and a tip 1526 that includes contact portion 1530. The radiation blocking member 1524 may vary in shape, and may include a sphere (as shown), a cylinder, a square box, a rectangular box, an ellipsoid, an annulus, or any other suitably shaped design. Referring back to the system in FIG. 12A, the stylus contact portion 1530 may be slidably engaged with a surface 1428. The height of the radiation blocking member is such that the center of the sphere generally intersects with an optical plane formed between one of a plurality of radiation sensors 1402 and a plurality of radiation sources 1406. The contact portion 1530 may be rounded off to prevent damage to the surface 1428. The spherical radiation blocking member 1524 is selected in this case because its cross-sectional area blocking the optical plane parallel to the surface 1428 is generally constant as the stylus changes rotation, pitch and yaw about the center of the radiation blocking member. The system disclosed herein that includes a plurality of radiation sources 1406 and a plurality of radiation sensors 1402 in the configurations disclosed herein may see a consistent cross-sectional occlusion of the optical plane in each of the plurality of optical planes. Similarly, the system disclosed herein observes a consistent attenuation of the optical signals transmitted across the plurality of optical planes regardless of the direction of signal relative to the radiation blocking member 1524. The cross-sectional area may change due to translation in the z-axis direction away from or towards the surface 1428. This change in the cross-sectional area due to z-axis translation may be measurable and the controller 1404 may use it determine an attenuation profile. The attenuation profile of the spherical radiation blocking member that is determined by the controller 1404 may correlate the observable changes in attenuation of the optical signal between the plurality of sources 1406 and the plurality of sensors 1402 with a z-axis displacement of the stylus relative to the surface 1428. Once the attenuation profile is calibrated, it may be possible to determine the z-axis translation of the stylus based upon the observed attenuation. This attenuation profile may further be used by the controller 1404 to determine an approximate stylus pressure.

Radiation blocking stylus comprises a handle that may be held by a user in their hand. The handle comprises a grip portion 1522 and a narrow portion 1528. Narrow portion 1528 may be shaped with a reduced radius relative to the grip portion 1522 and the radiation blocking member 1524.

The tip 1526 of the radiation blocking stylus may be made from an optically transparent material.

The narrow portion 1528 of the radiation blocking stylus may be made from an optically transparent material.

Figure 14:
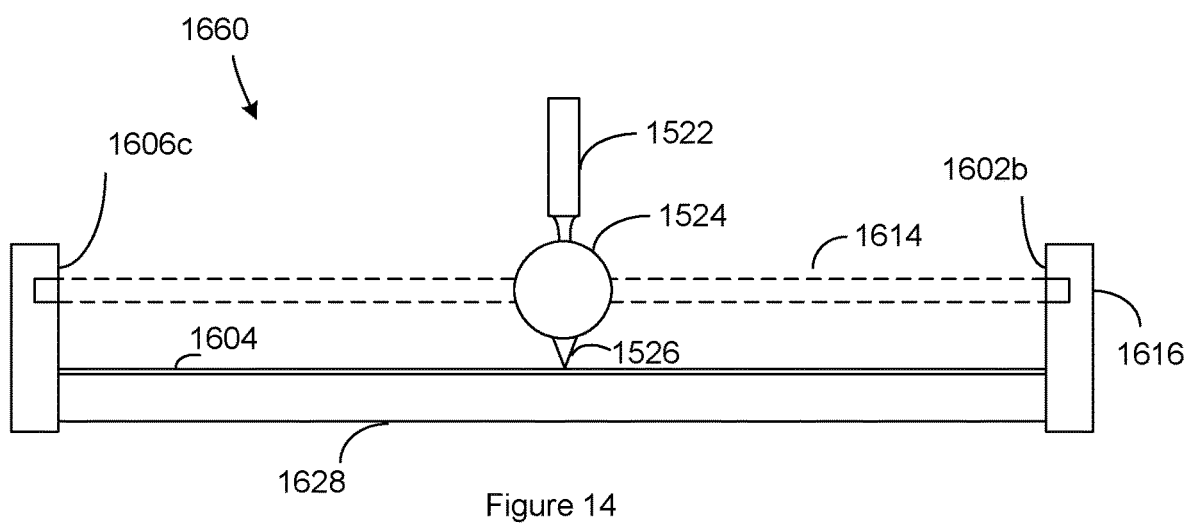
FIG. 14 illustrates where the radiation blocking element blocks the optical plane of the system in FIG. 12A.

Referring to FIG. 14, the cross-section diagram of the tracking system of FIG. 12A is shown where the radiation blocking member 1524 of the radiation blocking stylus completely blocks (or occludes) the optical plane 1614 and fully attenuates the signal between source 1606c and sensor 1602b. The contact portion 1530 of the tip 1526 is in slidable contact with the cover portion 1604 of screen 1628. The controller 1404 may use an attenuation profile to determine an approximate z-axis position in addition to the x-axis and y-axis position determination.

The stylus in FIG. 13 may be used with the system of FIG. 12A to provide a system for expanding a digital canvas. A user may provide user input by moving their fingers, or the stylus of FIG. 13 into the optical plane shown in FIG. 14. The user input may comprise a series of points including a start point and an end point. The start point may reflect the point where the stylus or finger begins to block the optical plane 1614 in FIG. 14. The end point may reflect the point where the stylus of finger finishes blocking the optical plane 1614 in FIG. 14.

The stylus of FIG. 13 may also indicate the start and end points via the use of a button or buttons on the stylus.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean areasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloads, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the invention, which is limited only by the appended claims. Also, in the various user interfaces illustrated in the figures, it will be understood that the illustrated user interface text and controls are provided as examples only and are not meant to be limiting. Other suitable user interface elements may be possible.

I claim:

1. A method of expanding a digital canvas, comprising:
receiving a first user input comprising a slice gesture;
determining a slice line on the digital canvas corresponding to the slice gesture, wherein the slice line comprises a start point and an end point;
  receiving a second user input comprising a first shift gesture;
  determining a first shift line on the digital canvas corresponding to the first shift gesture;
  receiving a third user input comprising a second shift gesture generally opposite in direction to the first shift gesture;
  determining a second shift line on the digital canvas corresponding to the second shift gesture;
  expanding the digital canvas along the slice line in a direction corresponding to the first shift line;
  expanding the digital canvas along the slice line in a direction corresponding to the second shift line; and
  adding a portion of canvas to the digital canvas bounded by a plurality of bounding lines, the bounding lines determined by:
    determining a first bounding line comprising a line formed from the start point of the slice line and extending parallel to the first shift line a length of the first shift line, wherein the first bounding line has a start point and an end point;
    determining a second bounding line comprising a line formed from the end point of the first bounding line and extending parallel to the slice line a length of the slice line, wherein the second bounding line has a start point and an end point;
    determining a third bounding line comprising a line formed from the end point of the second bounding line and the end point of the slice line, wherein the third bounding line has a start point and an end point;
    determining a fourth bounding line comprising a line formed from the end point of the slice line and extending parallel to the second shift line a length of the second shift line, wherein the fourth bounding line has a start point and an end point;
    determining a fifth bounding line comprising a line formed from the end of the fourth bounding line and extending parallel to the slice line a length of the slice line, wherein the fifth bounding line has a start point and an end point; and
    determining a sixth bounding line comprising a line formed from the end of the fifth bounding line and the start point of the slice line.

2. The method of claim 1 wherein the expanding the digital canvas comprises expanding the digital canvas along the slice line in a perpendicular direction to the slice line.

3. The method of claim 2 wherein the slice line comprises a slice line on the digital canvas corresponding to the slice gesture, the slice line projected in the digital canvas in either direction from both the start point and the end point.

4. The method of claim 1 further comprising providing a first shape located on the digital canvas inside a shift region bounded by a first projection line formed from the start point of the slice line and projected parallel to the first shift line in a direction corresponding to the first shift line;
  a second projection line formed from the end point of the slice line and projected parallel to the first shift line in a direction corresponding to the first shift line; and
  the slice line;
  wherein the expanding the digital canvas further comprises translating the first shape a length of the first shift line in a direction of the first shift line.

5. The method of claim 4 further comprising
providing a second shape located on the digital canvas outside the shift region;
the expanding the digital canvas further comprises maintaining the location of the second shape.

6. The method of 4 wherein
providing a third shape comprising at least two points;
wherein
  at least one point of the at least two points is located on the digital canvas inside the shift region;
  the expanding the digital canvas further comprises translating the at least one point of the third shape in a length of the first shift line in a direction corresponding to the first shift line.

7. The method of 4 wherein
providing a fourth shape comprising at least two points;
wherein
  at least one point of the at least two points is located on the digital canvas inside the shift region;
  the expanding the digital canvas further comprises
    creating a fifth shape comprising at least one point of the at least two points of the fourth shape outside the shift region;

creating a sixth shape comprising at least one point of the at least two points of the fourth shape inside the shift region comprising:
  translating the sixth shape a length of the first shift line in a direction corresponding to the first shift line.

* * * * *